Sept. 10, 1968     R. C. RICHARDS     3,401,392
DIRECT WRITING OPTICAL OSCILLOGRAPH
Filed Oct. 23, 1965

INVENTOR.
ROBERT C. RICHARDS
BY
ATTORNEYS

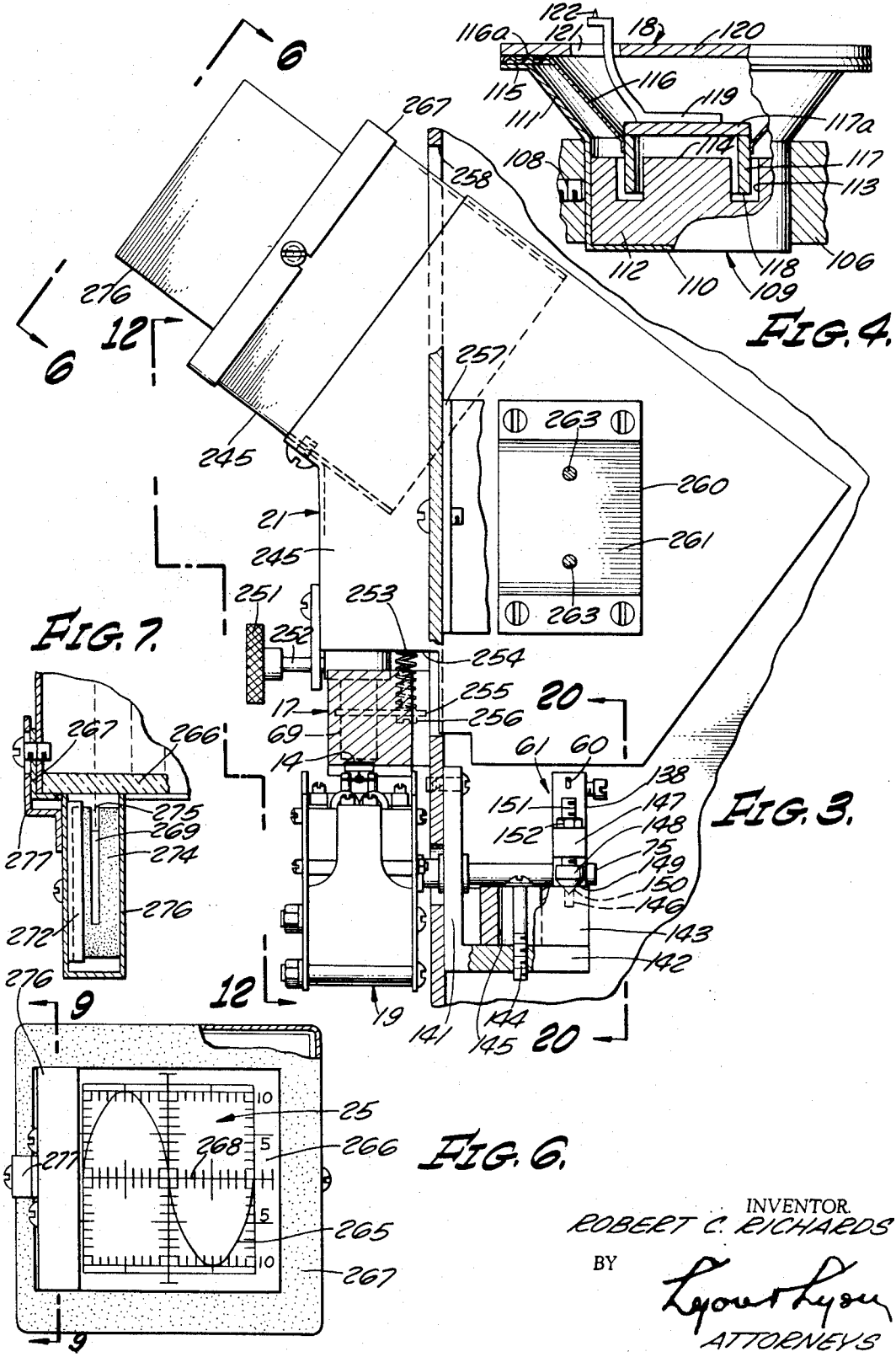

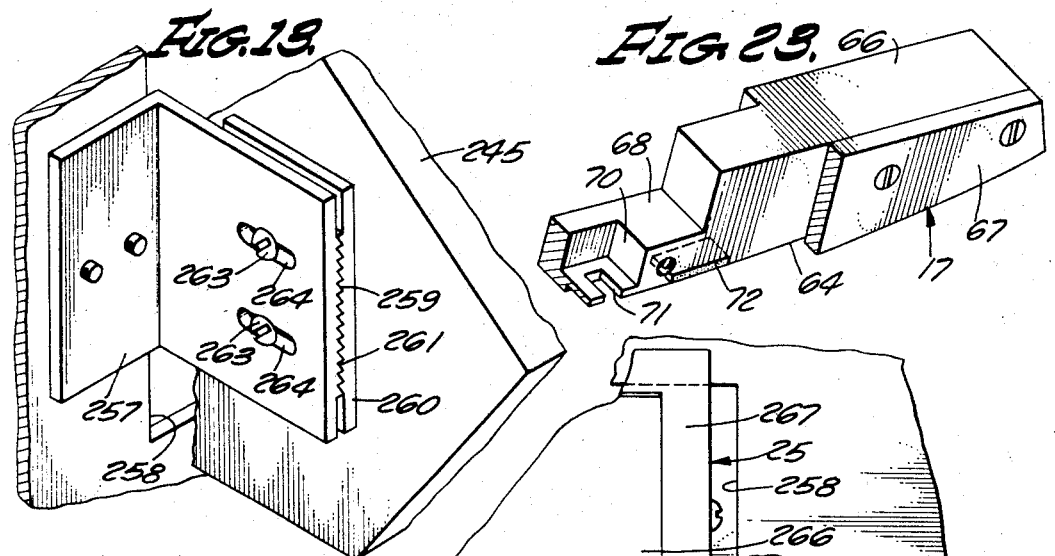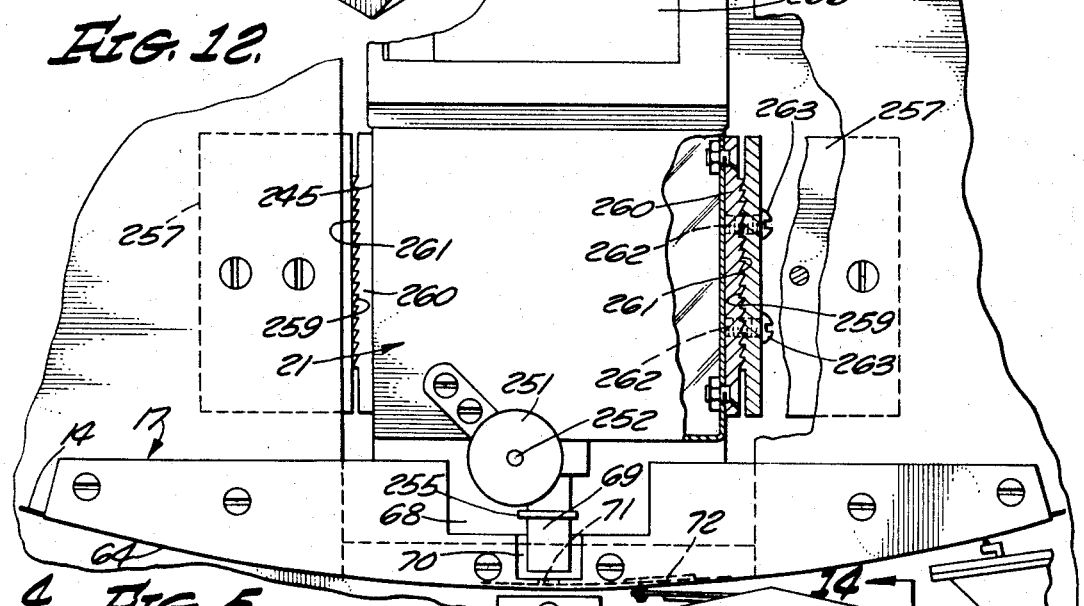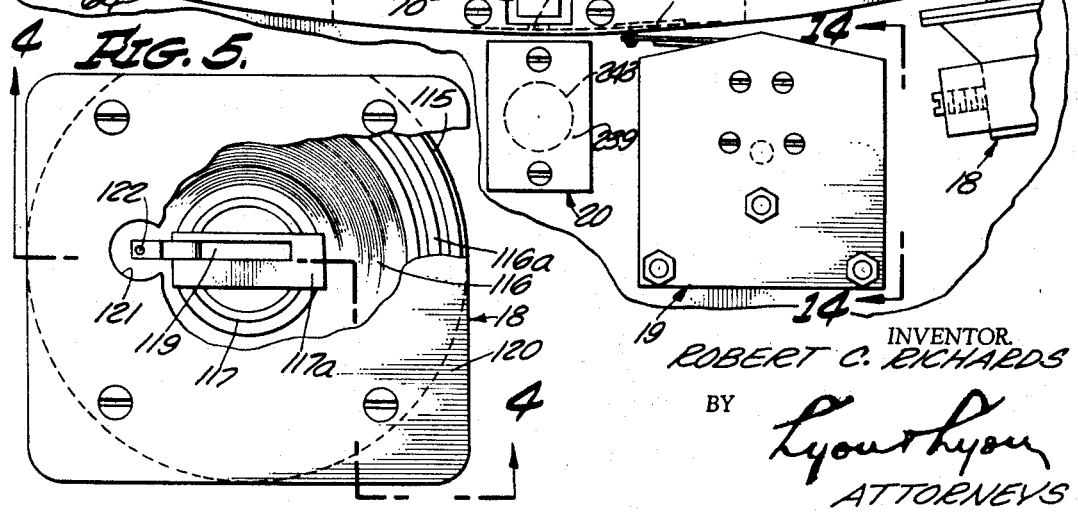

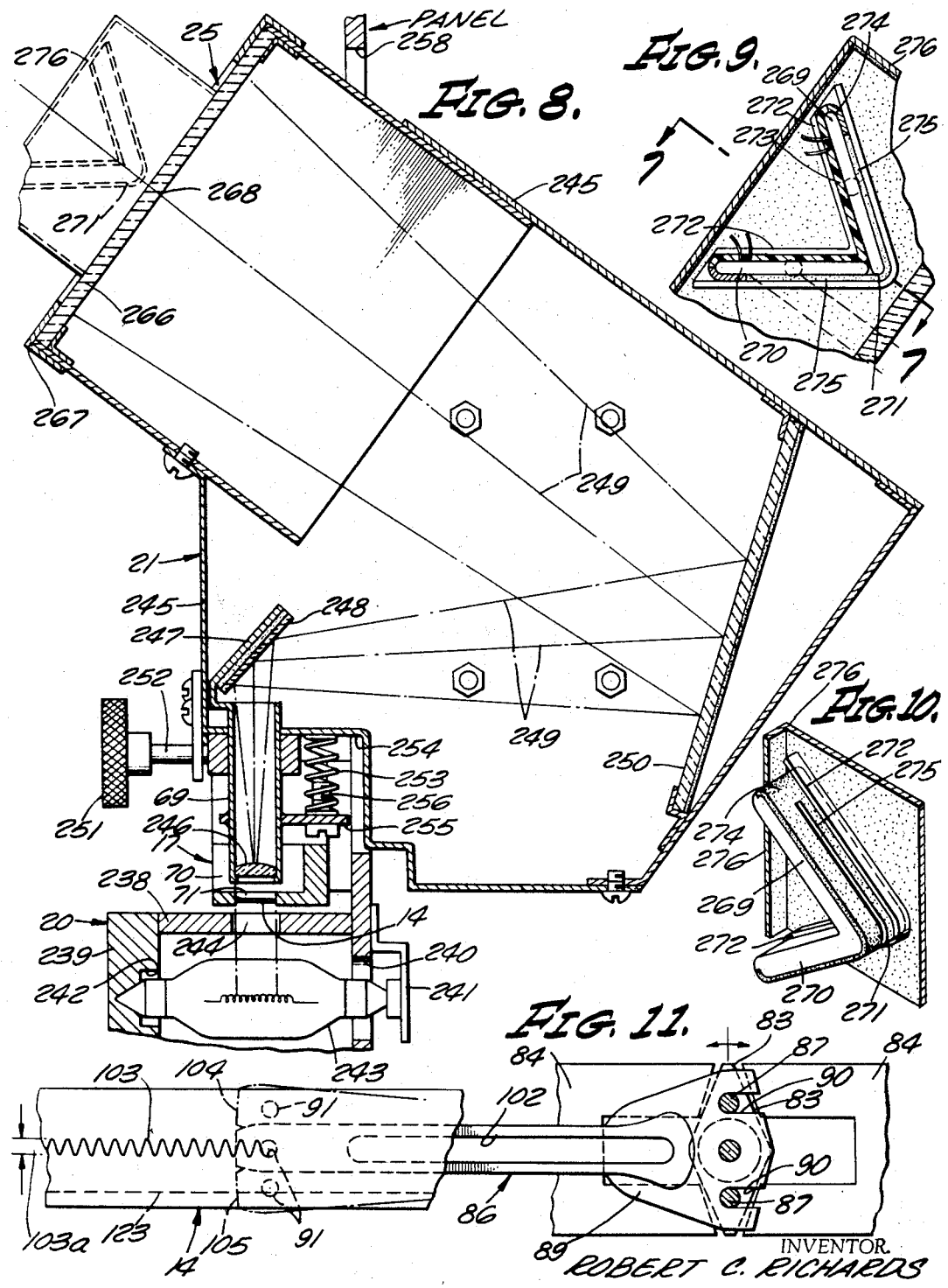

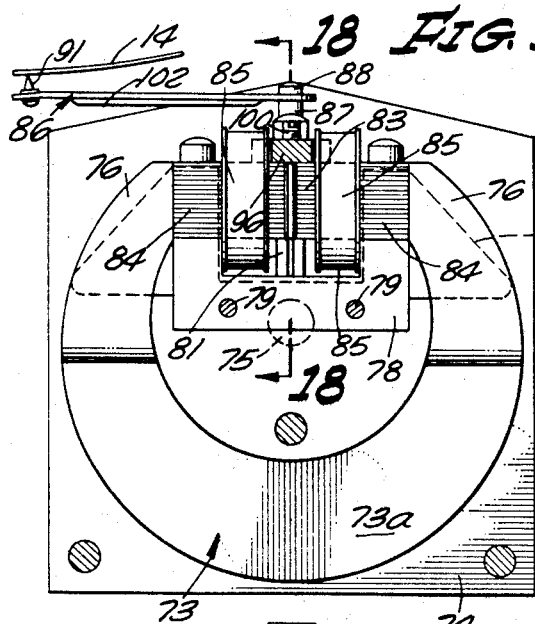
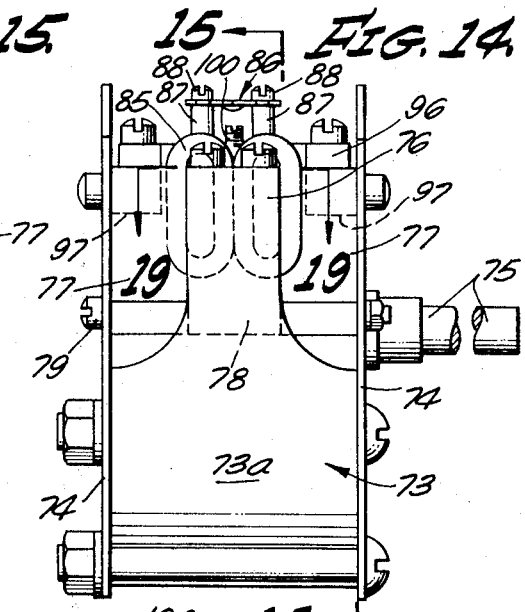
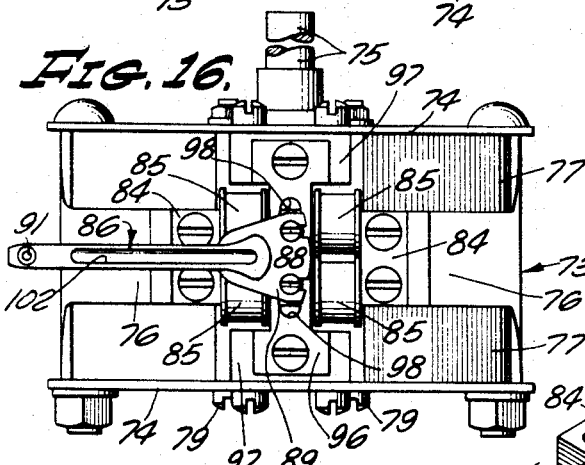
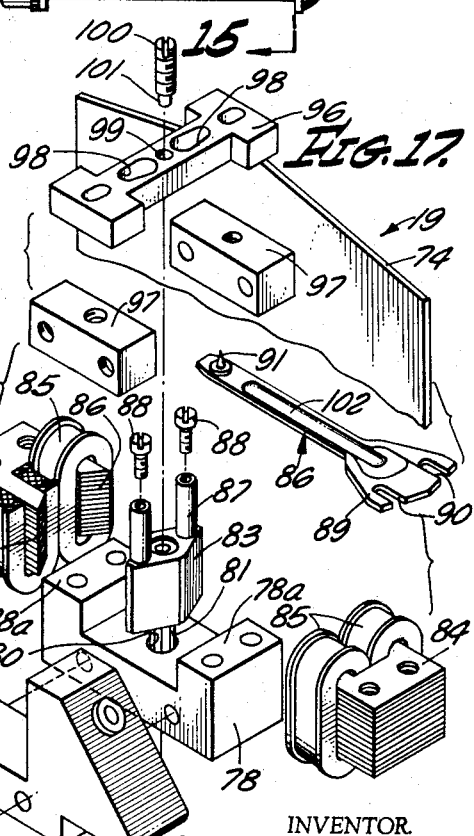

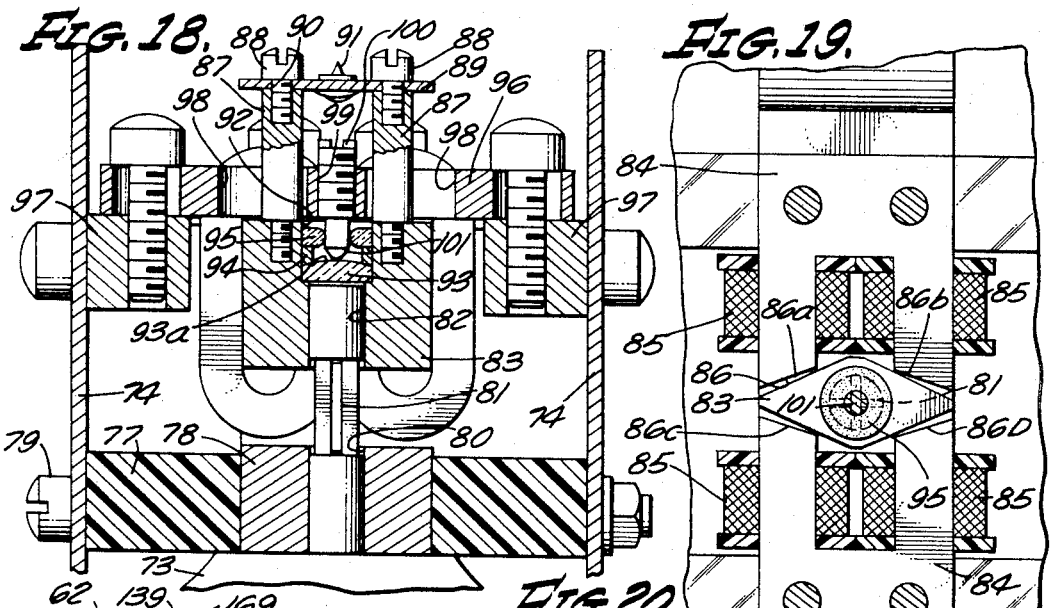

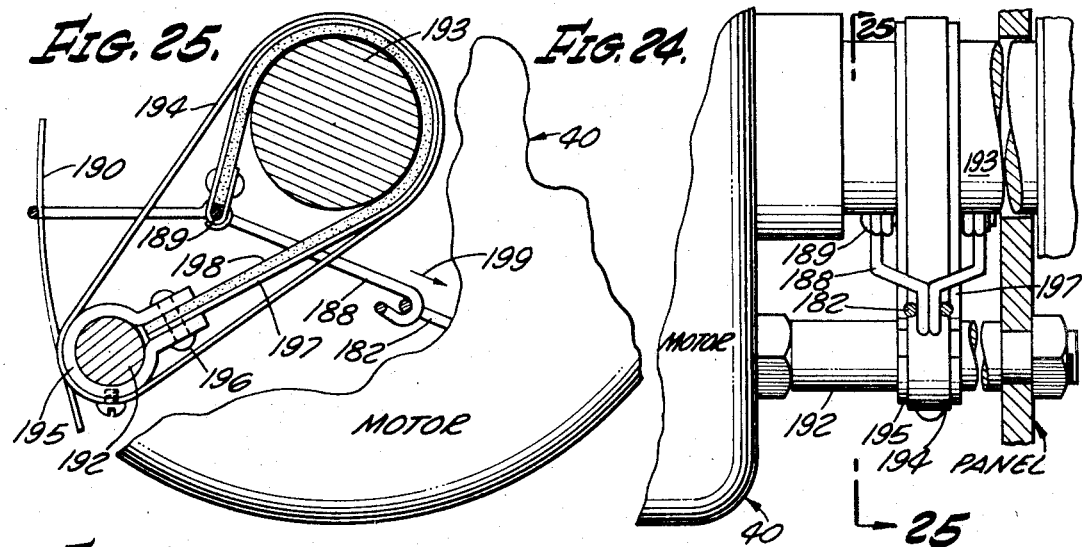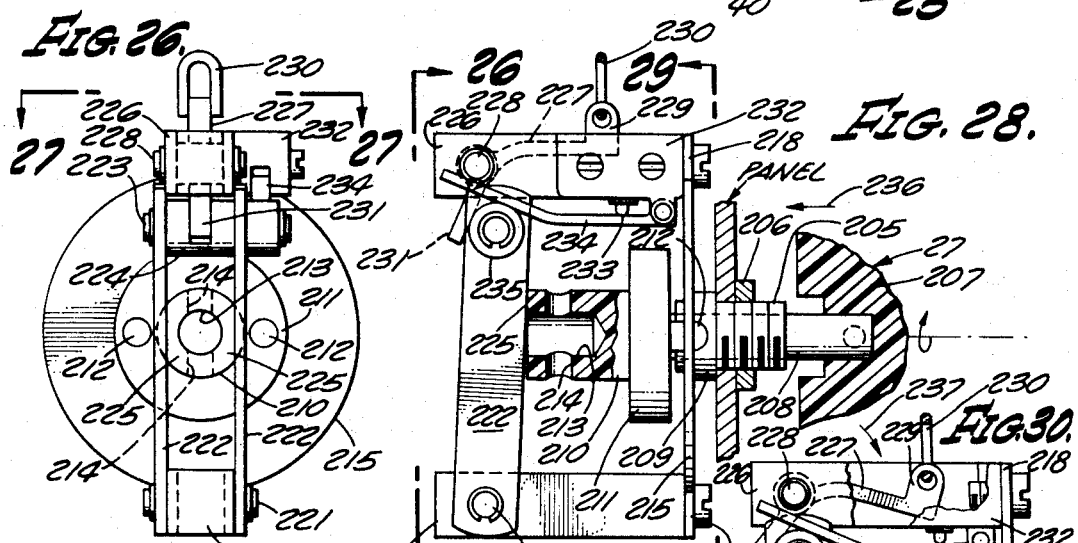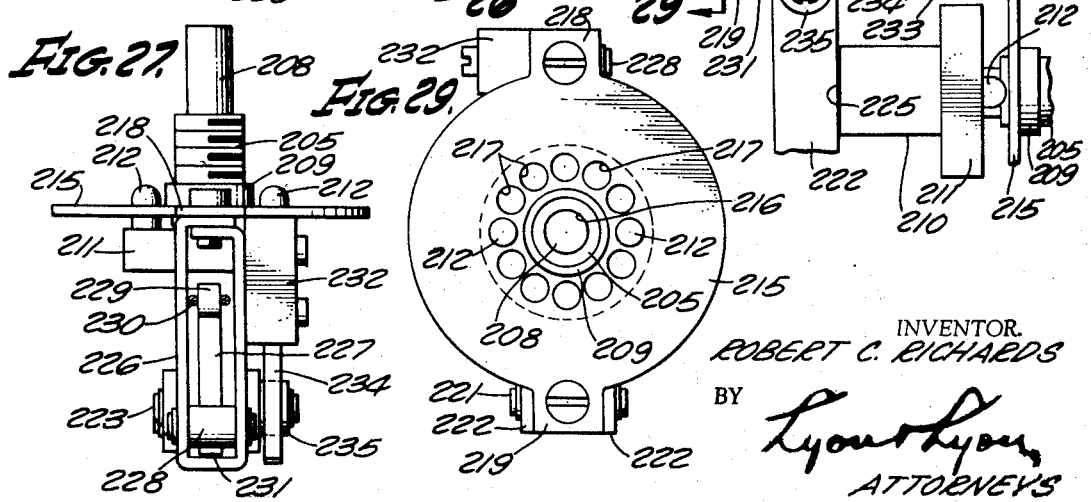

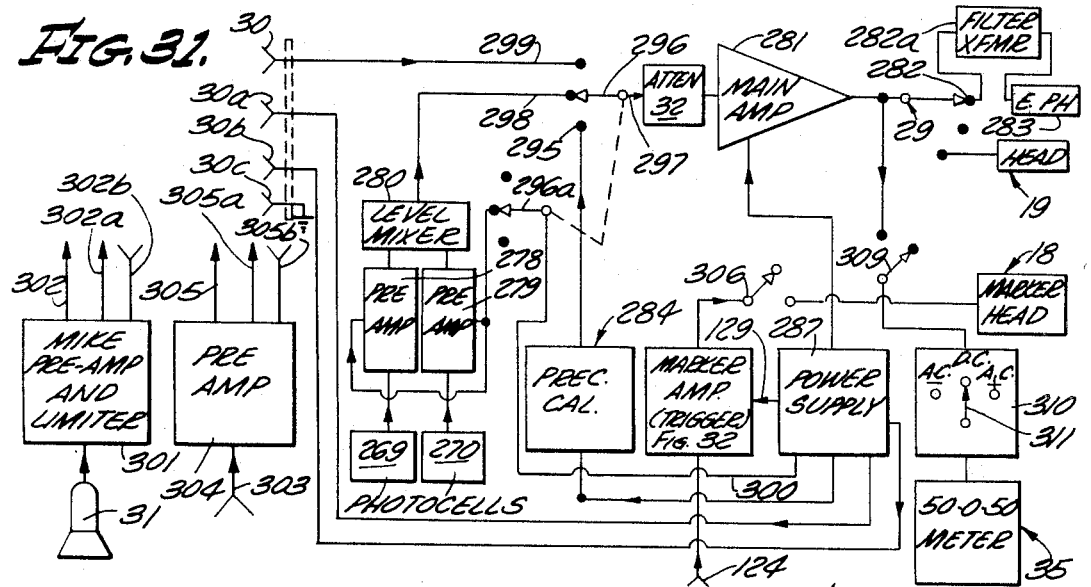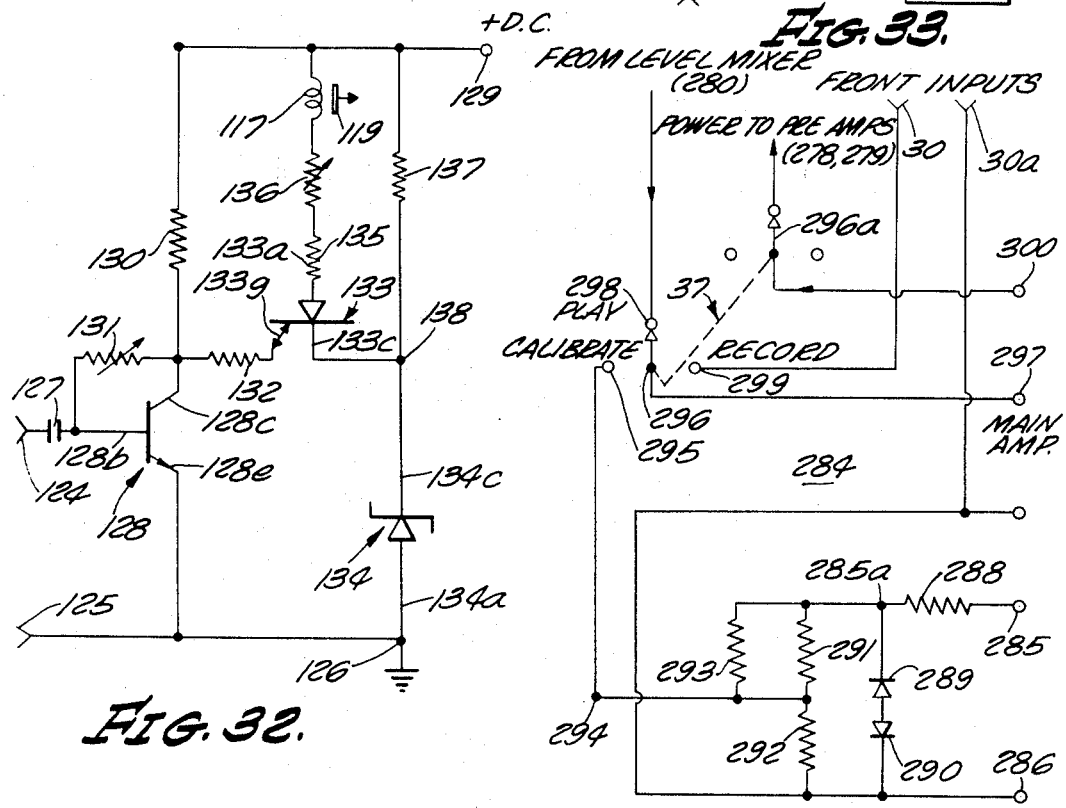

United States Patent Office 3,401,392
Patented Sept. 10, 1968

3,401,392
DIRECT WRITING OPTICAL OSCILLOGRAPH
Robert C. Richards, Los Angeles, Calif., assignor to Microsound, Inc., Los Angeles, Calif., a corporation of California
Filed Oct. 23, 1965, Ser. No. 503,794
16 Claims. (Cl. 346—17)

ABSTRACT OF THE DISCLOSURE

A direct writing oscillograph which accurately records a transparent analog trace of a signal in permanent form on a strip of tape whereupon the trace can be visually analyzed by the projection of a light through the trace to form an enlarged image, and the trace can be directly played back by projecting a light through the trace onto light responsive cells; and the method of analyzing sound or other electrical signals using such a device.

Description

The present invention relates generally to an apparatus for recording electrical impulses by writing them directly in a manner which faithfully reproduces the wave patterns. More specifically, this invention provides a device for recording electronic wave forms by directly tracing them onto strips of permanent recording material. Furthermore, this invention relates to a means for directly writing the wave forms of medium frequency audio-signals hitherto unreproducable in permanent form of sufficient size for analysis, yet at the same time reducing the required amount of recording media and, therefore, the storage volume of that media. In addition, this invention provides a unique apparatus for the recording, analysis and reproduction of audio-signals.

Research and development in many electronic fields as well as associated fields of study employing electronic analysis methods require that there be some means of observing the nature of electrical impulses being produced. There have been a great number of devices developed to meet this requirement, including the oscilloscope, the strip-chart recorder and so on. The oscilloscope has become a highly developed device and is perhaps the most reliable device for accurate reproduction and analysis of transient electrical phenomena. The problem is that the reproduction is not permanent and unless elaborate photographic techniques are employed, the image reproduced by the scope is lost forever. For many testing purposes, this is sufficient, but, where a permanent record is required for later examination, the oscilloscope is totally inadequate.

There are a number of direct writing recorders which have been developed to meet this inadequacy of the oscilloscope. Primary among such recording apparatus is the hot stylus strip-chart recorder which burns a trace on a strip of paper moving under the hot stylus. Other strip recorders using pen and ink are also available. The primary difficulties with such strip recorders are that the frequency response is drastically low, and to reproduce a single cycle of even medium audio frequency so that it is separately viewable, the paper must be run very fast. Under such conditions, faithful reproduction of the trace is not obtainable. In addition, a great amount of paper must be used and it becomes difficult to store conveniently. As an example, reproduction of a trace having a peak to peak amplitude of an inch and a half of a signal at 1,000 c.p.s., using the best equipment presently obtainable provides a trace with a maximum cycle width of approximately one-quarter inch, running the paper at a speed of 160 inches per second. The recording time at such a paper speed would be so short as to be practically useless.

Even though direct writing recorders have been made and are useful at low frequencies, neither these recorders nor the oscilloscope recorders provide any method by which the recorded phenomena can later be reproduced in electrical form from the printed trace. Thus, for the recording of transient electrical phenomena, no single device can provide a permanent visual record and play back the phenomena from that record as well.

It is an object therefore, of the present invention to provide a direct writing recorder having a small information storage area. It is also an object of the present invention to provide a recorder producing a large viewable image with a long recording time.

It is also an object of the present invention to provide such a recorder having a fast information retrieval capability. It is also an object of this invention to provide a direct writing recorder having a flexible recording speed providing satisfactory recording and play back reproduction over the medium frequency range and, in addition, a low speed visual read-out of the optical image.

It is also an object of this invention to provide a direct writing recorder which creates a permanent visible trace yet also has the capability of reproducing the recorded trace in electrical form.

It is a further object and advantage of this invention to provide a direct writing recorder which is moderate in cost, easy to service and maintain, and which employs a relatively few number of parts.

Further objects and advantages of this invention will become apparent upon reading the following description in conjunction with the drawings in which:

FIGURE 3 is a partial sectional side elevation taken substantially along line 3—3 of FIGURE 1 showing the projector.

FIGURE 4 is a sectional side elevation showing the detail of the marker head assembly taken along line 4—4 of FIGURE 5.

FIGURE 5 is an enlarged top view, partially broken away, of the marker head assembly taken along line 5—5 of FIGURE 1.

FIGURE 6 is a plan view of the viewing screen of the scope taken along line 6—6 of FIGURE 3.

FIGURE 7 is a partial sectional view taken along line 7—7 of FIGURE 9 showing the construction of the trace playback unit.

FIGURE 8 is a sectional side elevation taken along line 8—8 of FIGURE 1 showing the internal construction of the projector.

FIGURE 9 is a view taken along line 9—9 of FIGURE 6, partially in section, showing some of the internal details of the trace playback unit.

FIGURE 10 is a partial perspective view of part of the trace playback unit.

FIGURE 11 is a diagrammatic plan view of the trace stylus showing the manner in which it scribes a trace on a narrow strip of material.

FIGURE 12 is a partial sectional plan view showing some further details of the projector.

FIGURE 13 is a partial perspective view showing the adjustable mounting of the projector housing.

FIGURE 14 is a side view taken along line 14—14 of FIGURE 12 showing the recording head.

FIGURE 15 is a sectional side view taken along line 15—15 of FIGURE 14.

FIGURE 16 is a plan view of the recording head.

FIGURE 17 is an exploded view of the recording head.

FIGURE 18 is a partial sectional view taken along line 18—18 of FIGURE 15.

FIGURE 19 is an enlarged partial plan view showing the shape of the recording head armature and the laminated iron poles.

FIGURE 20 is a partial rear elevation of the front panel showing a method of mounting the recording head and the marker head.

FIGURE 21 is a perspective view of the recording strip guide.

FIGURE 22 is a perspective view of the other side of the strip guide.

FIGURE 23 is a partial sectional perspective view taken along line 23—23 of FIGURE 22.

FIGURE 24 is a partial side elevation taken along line 24—24 of FIGURE 2 showing the brake mechanism on the motor shafts.

FIGURE 25 is a sectional plan view taken along line 25—25 of FIGURE 24 showing further details of the brake mechanism.

FIGURE 26 is an enlarged rear elevation of the function switch and brake mechanism taken from line 26—26 of FIGURE 28.

FIGURE 27 is a top sectional view of the brake lever taken along line 27—27 of FIGURE 26.

FIGURE 28 is a side elevation of the brake lever mechanism taken along line 28—28 of FIGURE 2.

FIGURE 29 is a front elevation of the function switch plate taken along line 29—29 of FIGURE 28.

FIGURE 30 is a partial sectional view showing the position of the brake lever mechanism when the brake is engaged.

FIGURE 31 is a schematic block diagram of the circuit in this recorder.

FIGURE 32 is a schematic diagram of the circuit which drives the marker head.

FIGURE 33 is a schematic diagram of the calibration circuit and amplifier input switching circuit.

Figures 1, 2:
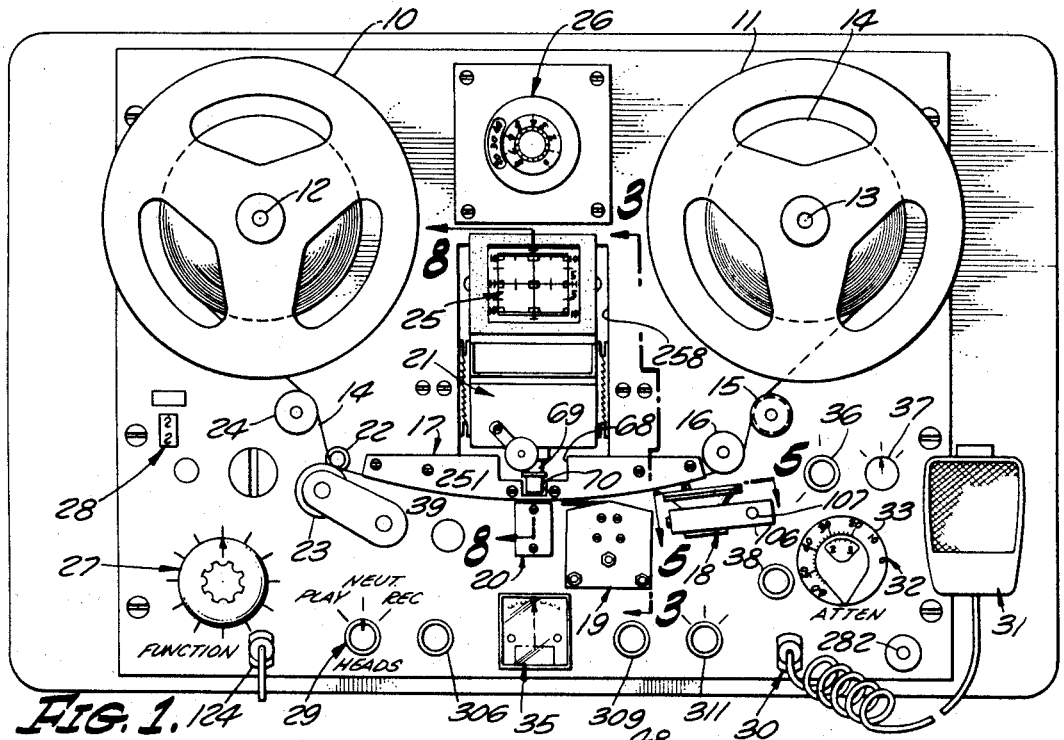
FIGURE 1 is a plan view of the front panel of the optical recorder made in accordance with this invention.
FIGURE 2 is a plan view, partially diagrammatic of the rear of the front panel.

The various specific features shown in the drawings which contribute to the make-up of the whole apparatus will each be taken up and described in turn. To facilitate the comprehension of these features and their relationship to the whole, as well as to underline the new principles employed by this apparatus, a brief prefatory explanation of the over-all operation and capability of the device is first provided.

An input signal to be recorded is amplified and fed to a recording head having a movable stylus arm which is thereby caused to oscillate laterally in a manner analogous to the wave pattern of the input signal. A narrow strip of recording material consisting of a Mylar tape having an opaque emulsion coating is fed past the recording head and the stylus cleaves a path through the emulsion leaving a transparent pattern traced thereon. To view the trace, the tape is fed slowly over a light source and a scope magnifies the image and projects it upon a large graduated screen, which is comparable in usable area to most three inch oscilloscopes now in general use. To play back the recorded signal, the tape is run over the light source and a photo-sensitive transducer positioned to receive the projected image converts the light image into electrical impulses.

The speed of the taper during recording will determine the traced cycle width for a given frequency input signal. To accommodate a range of frequencies and produce a trace of sufficient width that individual cycles can be separated and analyzed on the projection screen, the drive-speed of the tape is continuously variable over a wide range. This variable recording speed can be analogized to the variable sweep rate of the oscilloscope which permits the stopping of one or more cycles in a stationary display on the scope face. However, in the present device, the recording speed is continuously variable so that any given cycle width may be obtained whereas the sweep rate of the oscilloscope is usually only effective in obtaining displays of a discreet number of cycles. In addition, the variable speed drive also affords a means for playing back the wave pattern at selected speeds.

The present device is particularly adaptable to research in the fields of sound and speech analysis. A sound may be recorded on the tape at a particular recording speed. The resulting wave pattern may then be projected on the screen for analysis. The sound may also be played back at the same or different speeds to determine the effect thereof. Additionally, the input of other signals to the recording head will permit the drawing of new wave traces or the alteration of the original recorded traces to determine the effect of such changes on the reproduced sound.

The analysis of a recorded trace frequently is aided when some reference point is provided. A reference line may be drawn on the tape during recording by a marker head, the stylus of which likewise separates the emulsion on the tape to leave a transparent path. This marker head can also provide a time marker reference line on the tape by driving the marker stylus at selectable rates so that dashes are scribed on the tape as it passes by.

FIGURES 1 and 2 show the general layout of the front and rear of the control panel and several of the features of this invention. In FIGURE 1, a pair of tape reels 10 and 11 are mounted upon the motor shafts 12 and 13 respectively. These reels are of ordinary design and are adapted to contain the recording tape 14. Tape 14 passes from the feed reel 11 and over two rotary guides 15 and 16 to a curved stationary guide generally designated 17. As the tape enters the stationary guide 17, it first encounters the marker head generally designated 18, then the recording head generally designated 19, and then the tape passes over the projection lamp 20 and adjacent the projection scope 21. Upon leaving the stationary guide 17, the tape passes between the drive capstan 22 and drive roller 23, whereupon it passes over a rotary guide 24 and then onto the takeup reel 10. To view the traced image, the lamp 20 is illuminated and the scope 21 projects an enlarged image on the screen 25. The variable speed selector control is shown at 26 consisting of a vernier dial connected to a variable speed drive unit. By this vernier selector, precise tape speeds may be adjusted.

In the lower, left hand corner of the panel, there is a function selector switch 27 which connects various portions of the operating system depending upon whether the desired operation is to record, view, play back, etc. A tape position indicator 28 is shown providing an accurate indexing means for retrieving data recorded on known portions of the tape. Selector 29 determines the operating position of the recording and marker heads 18 and 19 depending upon whether the tape shall be run to record, view, or to play back the image. An input jack 30 is provided near the lower, right hand corner of the panel and is shown in this figure with a microphone 31 connected to this input. An input attenuator 32, including a vernier calibrated selector dial 33, is provided to adjust the voltage so as not to overdrive the recording head. This precision attenuator 32 retains the ability to determine amplitude of the recorded signal. In order to reduce tape waste, a prerecorded peak voltage indicator 35 is provided. This indicator serves as a means for DC-zero centering the main amplifier and in addition, indicates when the positive or negative excursion of the input signals may exceed the full scale of the viewing screen 25. Zero centering of the main amplifier is controlled by the knob 36. To further implement calibration of the unit, a precision voltage calibrator is provided and the control 37 switches this calibration voltage into the main amplifier so that the attenuator may be adjusted accordingly. Control knob 38 is provided to adjust the position of marker head 18 with respect to the tape guide 17. Control knob 39 is provided to adjust the amplitude of the marker head.

Turning now to FIGURE 2, a view of the rear of the front panel is shown partially diagrammatically. Motors 40 and 41 which drive the tape reels 11 and 10, respectively, are shown. A third motor 42 is mounted in the top center portion of the panel and is provided with a pulley 43 and belt 44 which drives pulley 45 of a variable speed drive unit 46. The calibrated vernier control 26 on the front of the panel is connected to the drive unit 46 through the flexible cable 46a and affords a uniformly variable output speed at the pulley 47. Drive unit 46 is mounted to the rear of the panel by means of shock mountings 48. A drive belt 49 extends over pulley 47 and flywheel 50. The flywheel 50 is attached to capstan shaft 22 which extends through the panel to the front. A wide range of tape speeds is available by the use of the drive unit 46 and present designs provide a range from .4 inch per second to 40 inches per second.

The tape position indicator mechanism 28 may be seen in FIGURE 2. This mechanism is of standard design but the driving source is unlike most tape recorders in which the mechanism is driven from the capstan. As such, it provides only an approximate position and can be quite inaccurate. For the purposes of this invention, it is desirable to be able to locate information on the tape with a high degree of accuracy. During analysis of the inscribed trace, the take-up or feed reels may be hand fed at which time the capstan is disengaged, and if such were to occur with the indicator driven by the capstan, the index is lost. In addition, no use is obtained from the indicator during hand feed. To prevent this loss of valuable indexing, indicator mechanism 28 is connected through drive belt 51 by the shaft of synchronous motor 41.

Also shown in FIGURE 2 is an assembly of brake linkage which applies braking to the two motors 40 and 41 and is actuated by the function switch 27. The details of this braking system will be more fully described subsequently in connection with FIGURES 25–28.

The head-control switch designated 29 in FIGURE 1 simultaneously controls capstan roller 23 and the position of the heads 18 and 19. A collar 52 mounted on the central shaft 53 of control 29 has a notch 54 cut in the periphery thereof. Pivot arm 55 is secured to roller arm 57 by means of the shaft 58 which extends through the front panel. Control 29 is in the neutral position when the notch 54 receives the lobe 56 therein. In this position, the roller arm 57 is pivoted clockwise about the shaft 58, as viewed in FIGURE 2, and the roller 23 is spaced away from capstan 22. When the control 29 is rotated either to the right or left, the lobe 56 will be dislodged from within the notch 54 and the pivot arm will be moved counterclockwise, causing the roller arm 57 to be similarly moved so that the roller 23 comes in contact with capstan 22. Additionally, when control 29 is moved to the "Record" position, it controls the position of the recording heads 18 and 19. Control 29 has a second collar 59 attached to shaft 53, slightly smaller in diameter than collar 52. Wrapped around collar 59 and secured thereto is a length of control linkage 60 which extends to and is attached to the rockers 61 and 62. The specific details of these rockers and their use for moving and centering the heads will be more fully described following the description of the recording heads themselves. Another feature included in FIGURE 2 is the housing 63 which contains the main amplifier and other associated circuitry.

Tape guidance

One of the primary difficulties encountered in attempting to inscribe a narrow strip of material which is moving at a rather high rate of speed is the lateral motion of the recording material as it passes through the recording and play back area. Such lateral motion is due primarily to inherent "wander" of the tape, but is augmented by the lateral forces of the recording stylus upon the tape surface. Total lateral movement is great enough to introduce errors as high as 20% in a straight line trace drawn on the material. Errors of such magnitude make the instrument completely unusable and it is desirable that errors introduced by this problem be less than 2%. In order to achieve such precision, a unique tape guide 17 is provided. Referring now to FIGURES 21 and 22 on page 6 of the drawings, it will be seen that tape guide 17 comprises an elongate body, the lower edge 64 of which is slightly curved. Where the lower edge of the guide is substantially flat, it is difficult to maintain surface contact between the tape and the guide, regardless of the tape speed. When the tape falls away at the center of the guide, viewing the trace thereon becomes difficult and the advantage of having a long guide, viz., reduction of lateral motion, is lost. Conversely, a guide having a curvature of small radius makes both recording and viewing difficult. The small radius results in a guide which is short, therefore leaving less physical space to place the projector, causing distortion of the image and having less lateral guidance. During recording, the pressure of the tape on a small radius guide creates a large amount of friction. Thus, the curvature of edge 64 must be sufficient to maintain surface contact along its entire length, yet is not so great as would cause excessive friction or image distortion.

In order to cure lateral wandering of the tape in the recording area, the lower edge 64 is provided with a recessed channel or slot 65 having a substantially rectangular cross section. Such a slot 65 may be machined directly into the edge 64, or to simplify the construction, one can machine only the recess into the body 66 and then attach the front plate 67 thereto. This makes the machine work to form the slot 65 considerably easier, yet obtaining the same degree of accuracy in width. In addition, the cleaning of slot 65 is facilitated. Recording tape can be slit by the manufacturer quite accurately to a given dimension so that the width of slot 65 is machined to a very close tolerance. For example, a .002 tolerance for a tape width of .250 inch is effective to reduce lateral tape wander to an error of less than 2%.

As seen in FIGURE 12, the central portion of body 66 is cut out to form the large cavity 68 for the introduction of the lens 69 of the projector which is generally designated 21. A smaller cavity 70 allows the approach of lens 69 to a point extremely close to the tape 14 and aperture 71 is cut in the lower edge 64 in the cavity 70 where the thickness of the lower edge has been reduced substantially. The lamp unit 20 is situated opposite the aperture 71 and positioned to project a beam of light through aperture 71 and into lens 69. The provision of the front plate 67 also facilitates the machining of the cavities 68 and 70 and the aperture 71. When the front plate 67 is in place, the aperture 71 is substantially rectangular in shape.

Although the required stylus pressure is not great, a slightly resilient surface under the recording area enhances the trace clarity and readability by reducing skipping of the stylus at high frequencies. Thus, a resilient insert 72 is applied in the slot 65 as shown in FIGURES 21, 23 and 12, consisting of a very thin piece of Teflon or other similar material.

Recording head and stylus

FIGURES 14 through 19 on pages 5 and 6 of the drawings include detailed views of the recording head generally designated 19. This recording head consists of a large C-magnet 73 rigidly mounted between two side plates 74. To one of these side plates 74, there is secured the rocker shaft 75 by which the entire head assembly is pivotally mounted in the position shown on the front panel view in FIGURE 1. The C-magnet 73 has an enlarged lower portion 73a of greater width than at the extremities 76, as can best be seen in the exploded view of FIGURE 17. Between the upper extremities 76 and the side plates 74, there are inserted dielectric spacers 77. Between spacers 77, and in the interior of the C-magnet, the base block 78 is rigidly mounted by means of the two fasteners 79, extending through the side plates 74, the spacers 77 and the base block 78.

As seen in FIGURES 15 and 17, the base block 78 is of substantially rectangular U-shaped configuration and in the lower portion thereof, has a vertical bore 80. Rigidly secured in bore 80 is the lower end of torsion column 81, the upper end of which is rigidly attached in the central bore 82 of a diamond-shaped armature 83. On each of the upper extremities 78a of block 78, there are mounted laminated U-shaped poles 84. Each arm of the U-shaped poles 84 is surrounded by a field coil 85. In position, the rear faces of the laminated poles 84 are contiguous to the inner faces of the C-magnet extremities 76, thus extending the magnetic flux path through the laminated poles. Base block 78 is of a nonferromagnetic material, and thus the flux path is not disturbed by this mounting block. In FIGURE 19, it will be seen that the inner faces 86 of the laminated poles 84 are machined at different angles than the armature 83 so that these faces are not parallel to the adjacent sides of the diamond-shaped armature 83. Greater clearance is required near the outer extremities of the armature 83 to provide for rotation thereof without making contact with the pole faces 86. The field coils 85 are electrically connected so that input current fed thereto will cause alternate attraction and repulsion at the faces 86 of the poles 84. For example, current having a given direction at a fixed point in time will cause magnetic attraction at faces 86a and 86d, and repulsion at faces 86b and 86c. (See FIGURE 19.) Thus, the action of the field coils 85 together with that amount of flux provided by the C-magnet 73 will cause the necessary flux change to produce a pivotal motion of the armature 83 about its vertical axis through the bore 82.

To transfer this pivotal motion to a lateral motion in order to inscribe a trace, a stylus arm 86 is attached to armature 83 by mounting upon the standoffs 87 with fasteners 88. The stylus arm 85 is a substantially flat member having an enlarged base portion 89 in which there are provided the slots 90 to receive the fasteners 88. A channel 102 is formed in the arm 86 to provide rigidity to the arm without increasing its weight, thereby retaining a low-inertia characteristic. At the other exteremity of arm 86, there is mounted a diamond stylus 91 sufficiently fine to produce a trace width on the tape of about 1 or 2 percent of the full scale trace height.

As thus far described, the pivotal motion initiated in the armature 83 is transferred to a substantially lateral motion at the end of the stylus arm. However, at high speed, some whipping of the top of the armature 83 may be encountered, consisting of a slight rotational motion of the armature 83 about a horizontal axis. This whipping introduces error in the trace and may cause the stylus to lift away from the tape surface. In order to eliminate whipping, the top portion of armature 83 is secured against lateral motion in any plane by means of a jewel bearing, which can best be seen in FIGURE 18. This jewel bearing consists of two portions, the female portion mounted inside the armature 83 and the male member carried by a bridge secured to the side plates 74.

To form the female portion of the bearing assembly, bore 82 is enlarged to form an upper bore 92 in armature 83. At the bottom of bore 92 there is mounted a jewel bearing 93 having a convex upper surface 93a. A thin annular spacer is situated above the bearing member 93 around the inner periphery of bore 92 and supports a semitoroidal bearing element 95. The element 95 is semitoroidal in tne sense that the inner edges are rounded as shown in FIGURE 18.

The supporting bridge 96 is securely mounted to edge blocks 97 which are in turn secured rigidly to side plates 74. Bracket 96 has two slots 98 which allow clearance for the standoffs 87 upon which the stylus arm 86 is mounted. These slots 98 are sufficiently large to provide for clearance of the standoffs 87 during pivotal motion. In the center of bracket 96, the male portion of the jewel bearing is threadably mounted in the bore 99. The set screw 100 has a jewel bearing 101 attached to the tip thereof. The jewel bearing 101 attached to the tip thereof. The jewel bearing 101 is cylindrical in shape and is rounded at the end to provide low friction pivotal movement when in contact with the convex surface 93a of bearing element 93. Likewise, the diameter of jewel member 101 is such that it is contiguous to the inner peripheral rounded edge of toroidal jewel member 95, thus substantially eliminating lateral motion of the top of armature 83 while retaining low friction pivotal motion about the vertical axis.

Referring to FIGURE 11, a magnified view of the stylus arm 86 is shown mounted on the standoffs 87 as previously described. The stylus arm 86 is constructed of flat, light weight stock and the channel 102 is depressed along the length thereof to provide rigidity to the arm. The diamond stylus 91 is mounted near the extremity of arm 86 and is diagrammatically shown inscribing upon the tape 14 an analog trace 103. As indicated at 103a, the peak-to-peak amplitude of trace 103 can be as small as 35 mils and still produce a viewable trace on the scope. By restricting the trace amplitude to a small size, the travel of stylus 91 is limited, thus substantially increasing the upper frequency limit of the recording head before other limiting factors such as armature movement or stylus arm resonance come into play. As a further advantage of the small trace amplitude, the phantom lines indicate two additional positions of the armature 86 at 104 and 105. This permits as many as three independent traces to be inscribed on tape as narrow as one-quarter inch without interference among them.

Marker head

FIGURES 1, 4 and 5 on pages 1, 2 and 4 of the drawings disclose the details of one embodiment of marker recording head used in conjunction with the present invention. The marker head carries the general designation 18 in FIGURE 1 and is shown mounted on the front panel by means of a bracket 106 attached to the rocker shaft 107. The cross-sectional view in FIGURE 4 shows a portion of the mounting bracket 106 securing the body of the marker head thereto by means of a set screw 108. The body 109 of marker head 18 comprises a lower cylindrical housing 110 and an upper frusto-conical housing 111 integrally attached to the cylindrical housing. The interiors of cylindrical housing 110 and frusto-conical housing 111 communicate with one another and the bottom of the cylindrical housing is closed. Situated in the bottom of housing 110 is a permanent magnet 112 having an annular groove 113 cut in the upper surface 114.

The outer edge of the frusto-conical housing is provided with a flange 115. Secured to the flange 115 is a diaphragm member 116 likewise formed in a frusto-conical configuration extending substantially parallel to the outer walls of the conical section 111 and having a resilient annular section 116a. The lower edge of diaphragm member 116 is attached to the drive coil 117 having a generally cylindrical configuration with the lower end 118 thereof open so that it extends into the annular recess 113. Stylus arm 119 is rigidly mounted upon the coil 117 by attachment to a rectangular strip 117a and extends obliquely upwards toward the larger opening of the diaphragm member 116. Secured to the upper periphery of the diaphragm member 116 and coterminous with the flange portion 115 is a covering plate 120 having an aperture 121 therein adapted to permit the stylus arm 119 to extend thereabove. The stylus 119 carries a diamond stylus 122 at its extremity.

The provision of a marker head permits its adaptation for a number of operations. Most simply, it can be used to inscribe a straight, continuous line on the tape for use as a center line or base line. The features of its construction, however, enable its use to inscribe digital information on the tape either as a separate operation or in conjunction with correlating analog data being inscribed by the recording head. A significant application is the simultaneous recording of time marker dashes during the recording of other data to provide a time reference for that data. Such time markers can be based on real time or determined by some other event significant to the analog data being recorded. FIGURE 11 on page 3 of the drawings shows a time marker trace 123 on tape 14 consisting of a series of short, equally spaced dashes.

A marker pulse generator providing pulses of variable speed and duration is schematically shown in FIGURE 32, page 8 of the drawings. This circuit does not include a time base generator but provides for the input of the time signal at the terminals 124, 125. This circuit can be driven by any external source, including an ordinary audio-frequency signal generator. Terminal 125 is connected to the common side indicated at 126 as ground, but this need not be the common ground of the entire unit. Terminal 124 connects to an input capacitor 127 which in turn is connected to the base electrode 128b of transistor 128. Emitter 128e is connected to ground and collector 128c is coupled to a voltage source at terminal 129 through resistor 130. A variable resistor 131 coupled between collector 128c and base 128b controls the output level of transistor 128.

The output of transistor 128 at the collector 128c is connected through resistor 132 to the gate electrode 133g of the gate controlled switching diode 133. Diode 133 is a diffused PNPN semiconductor type device having a gate control electrode whereby the diode can be switched on by a positive signal and off by a negative signal. An example of such a diode is type MGCS–924 manufactured by Motorola Semiconductor Products, Inc. of Phoenix, Arizona.

The cathode 133c of diode 133 is connected to the cathode 134c of Zener diode 134, the anode 134a of which is connected to ground potential. The anode 133a of diode 133 is coupled through limiting resistor 135 and variable resistor 136 to one side of the drive coil 117 of the marker head. The other terminal of drive coil 117 is connected to the voltage source at terminal 129. A resistor 137 is connected across the diode switch 133 from cathode 133c to the voltage terminal 129.

Resistor 137 provides the necessary current from voltage source 129 to the cathode 134c of the Zener diode to keep the diode in a state of conduction under varying current conditions. The constant current provided by the diode will establish a nearly constant voltage at the cathode of the switch 133 with respect to ground 126. Resistor 131 is adjustable so that the base current can be varied in transistor 128 to control the collector current. Resistor 130 is connected in series with the collector 128c and with the voltage source 129. A given voltage may therefore be established between collector 128c and emitter 128e by varying resistor 131. The voltage at collector 128c is adjusted until it is nearly equal to the voltage at the cathode 133c of the gate controlled switch, both with respect to ground 126. The resultant voltage on the switch between the gate terminal 133g and the cathode 133c will be approximately zero. A voltage at collector 128c which is sufficiently positive with respect to the cathode 133c will cause the gate controlled switch 133 to conduct. Current will flow through the diode and thus through the marker head coil 117, and will continue to flow even after the removal of the positive voltage emanating from collector 128c. Current flow will continue until the voltage at collector 128c is dropped sufficiently negative with respect to cathode 133c to shut off further conduction in the diode 133. Thus, the current through the marker head coil 117 is turned on and off by the voltage at collector 128c. Resistor 132 serves as a current limiter in the gate to cathode loop.

The operation of this circuit is readily understood. A sinusoidal input at 124 will cause transistor 128 to alternate between a partially conducting and a fully conducting state, thereby producing at collector 128c, a voltage level which varies about the reference value established by the Zener diode 134 and the resistor 137. The reverse bias on diode 134 is such as to cause it to conduct in its Zener mode so that the reference voltage established at terminal 138 will remain reasonably constant regardless of the state of the gated diode 133. When the voltage at the gate electrode 133g exceeds the reference voltage by the required "turn on" value, the diode 133 will conduct and current will flow through the drive coil 117. Conduction will continue until the voltage at 133g goes sufficiently negative, i.e., below the reference value, to turn off the diode. Conduction will not again recur until the gating voltage again exceeds the "turn on" value.

The variable resistors 131 and 136 control the character of the marker dashes produced by the stylus 119. Resistor 131 varies the base current in transistor 128 and thus sets the output voltage level at 128c. As this output voltage is increased, for example, the "turn on" gate voltage is reached more rapidly in a given cycle, and the "turn off" voltage is reached later. Thus, conduction persists for a longer time through coil 117 and the stylus will make dashes of greater length. Conversely, a decrease of the operating level of the output voltage of transistor 128 produces shorter marker dashes.

The resistor 136 varies the voltage drop across the drive coil 117 and this determines the distance of travel of the marker stylus 119. This in turn provides a means for finely adjusting the trace inscribed so that it is neither too faint nor so heavy as to allow the stylus to drag or tear the tape, but rather is sharp and distinct.

In addition to the above described operation employing a sinusoidal input at terminal 124, the marker head may be employed to inscribe signals carrying other information. For example, audio-signals could be recorded using this type of recording head by properly gating the pulse generator so that dashes are inscribed wherein the length of each dash will indicate the amplitude of a particular signal, and the separation of the dashes will indicate frequencies. Proper gating of the generator will depend upon appropriate adjustment of the output voltage at collector 128c. Where used to inscribe time information, the proper adjustment of resistor 131, depending upon the level of the input voltage, will determine the length of the dashes inscribed upon the tape. These dashes can be adjusted so as to approximate dots.

*Marker and recording head centering*

As noted in connection with the description of FIGURE 11, the narrow trace width may permit the inscription of more than one trace on the same portion of tape. Even with a single trace, it is necessary that the location of that trace be definitely determined, and it is further desirable that that location be adjustable. Further, though the recording heads are frequently lifted away from the tape, it is important that their preset locations are repeatable not only laterally with respect to the tape, but the vertical separation between the heads and the tape surface.

The operation of the head control switch 29 was briefly described above as the control for the capstan drive assembly. It was there stated that by means of the control linkage 60 attached to the rocker members 61 and 62, the positions of the recording heads were controlled. Referring now to FIGURES 2, 3 and 20, control linkage 60 is shown attached to the upper lever arms 138 and 139 of rockers 61 and 62 respectively. When the tape is not being driven, or when operated in the playback mode, it is desired that the styli 91 and 122 both be lifted away from the tape so as not to make any inscription thereon. FIGURE 20 shows the position of the rockers 61, 62 in their most counterclockwise position whereby both the styli 91 and 122 will be rotated to a position where they will contact the surface of the recording tape. Rotation of the collar 52 together with collar 59 in a clockwise direction will place tension on the linkage 60 in a direction toward the right of FIGURE 20 causing rockers

11

61, 62 to rotate clockwise whereby the recording heads will be lifted away from the tape. Conversely, when the collar 59 is rotated in a counterclockwise direction, the tension on linkage 60 will be decreased so that the rockers can move to lower the recording heads to their "record" position.

In order to achieve proper centering of the recording heads laterally with respect to the tape, the rockers 61 and 62 are provided with adjustable centering assemblies which are most clearly shown in FIGURES 3 and 20. Rocker 61 is secured to rocker shaft 75 of recording head 19 by any suitable means such as the set screw 140 shown, and the shaft 75 is rotatably journaled in an aperture in the control panel. An L-shaped bracket 141 is secured to the back of the control panel so that the lower horizontal leg 142 extends outwardly away from the back of the panel. A centering block 143 is adjustably mounted on the horizontal leg 142 by means of the bolt 144 which extends through the slot 145. Slot 145 permits the location of centering block 143 to be adjusted normally to the control panel by loosening the bolt 144. Centering block 143 also has a circular countersunk aperture 146 located on the top thereof, rearward of slot 145. Lateral arm 147 of rocker 61 carries a centering cone 148 attached thereto. When the rocker rotates counterclockwise, the centering cone 148 will enter the aperture 146. Upon so doing, the conical surface 149 will contact the annular beveled edge 150 of aperture 146 and seat therein. The angle of the conical surface will cause the rocker shaft 75 to move longitudinally to the same predetermined location each time the recording head is lowered to the "record" position.

To achieve proper separation of recording head 19 above the tape 14, the centering cone 148 is attached to an adjustable stem 151, threadably mounted in arm 147, with a locking nut 152. To assure that centering cone 148 is firmly seated in aperture 146, a compression spring 153 is mounted between the horizontal leg 142 and the lateral rocker arm 154 and is retained in position by the spring guide 155 pivotally attached to rocker arm 154 and extending through aperture 156 in leg 142. A stop 157 may be attached to spring guide 155 if desired, to limit excessive counterclockwise rotation.

Turning now to the marker head centering assembly, a somewhat different apparatus is employed, since it is required that there be some way for readily adjusting the separation of the head and the tape from the front panel. The rocker 62 is secured to the rocker shaft 107 by the set screw 158. A bracket 159, similar to bracket 141, is attached to the control panel and has a horizontal leg 160. A slidable centering block 161 is mounted upon leg 160 by means of the bolt 162 which extends through a slot similar to slot 145 in block 141. The centering block can thus be adjusted in a direction normal to the control panel.

For lateral centering of the marker stylus, a centering cone 163 is carried on a stem 164 threadably positioned within bore 165 of block 161. The rocker arm 166 of rocker 62 has a vertical countersunk bore 167 therein adapted to receive the extremity of cone 163. As described above, when rocker 62 rotates counterclockwise, the cone 163 seats in the bore 167, returning the rocker and thus the marker head to its preadjusted position. To assure accurate positioning, the compression spring 168 is positioned between rocker arm 169 and bracket leg 160, and is retained there by the spring guide 170 having the adjustable stop 171 thereon.

The relative separation of the marker head and the tape are adjusted by vertically threading the cone 163. The cone stem 164 is connected to a leaf assembly 172 which in turn is mounted upon the axial shaft 173 of a screw jack 174. This screw jack is of ordinary design, including the two bevel gears 174a, 174b and the axial shaft 173. The jack 174 is mounted in a bracket 176 secured to the control panel and a shaft (not visible) connected to gear 174b extends through the panel and has a control knob thereon as shown at 38 in FIGURE 1. Rotation of this knob 38 causes vertical movement of the cone 163, causing rotation of rocker 62 and of bracket 106, thus adjusting the separation of marker head 18 and the tape 14.

*Braking system*

In order that the unit will have adequate reproduction capabilities, it is necessary that a proper amount of tension is kept on the tape, not only during playback but during the recording thereof. A proper amount of tension will keep the tape in contact with the tape guide surface 65 so that it does not warp or wrinkle during recording. In addition, the initial focus maintained in the viewing scope will produce a sharp image on the screen during playback as long as the tape stays in contact with the tape guide surface 65. In view of this requirement, and further in view of the high tape speeds frequently used, a smooth and effective braking system is a necessity. Braking must be so smooth as not to stretch or damage the tape, but conventional braking devices employed with torque motors are not satisfactory. Accordingly, the present invention provides a wrap-around type brake operative upon each of the torque motor shafts.

FIGURE 2 and FIGURES 24 through 30 show the details of the present braking system. The torque motors are designated 40 and 41. The brake applied to the torque motor 40 will be described in detail, it being understood that the brake on torque motor 41 is of similar construction. The brakes are actuated by a mechanism mounted on the function switch 27, the details of which will be described subsequently. The function switch 27 is connected to the primary brake cable 178 which is divided into two cables at junction 179 both of which extend over a pair of pulleys at 180, said pulleys being mounted on the motor support leg 181 of torque motor 41. A brake cable 182 extends from the pulleys 180 over a second pulley 183 which is mounted on another of the motor support legs 184 of torque motor 41. The brake cable 182 is then coupled through a turnbuckle 185, extends over a third pulley 186 mounted upon the motor support leg 187 of torque motor 40, and is then connected to the brake bale 188. The configuration of the bale 188 can best be seen, in part, in FIGURE 24 on page 7 of the drawings. It consists of two generally U-shaped wire members joined by a pin 189 which joins all of the arms of the U-shaped members to form a generally rectangular shape. The brake cable 182 is attached to one end of the bale 188 and the other end of bale 188 extends around and engages a spring arm which is attached between the motor support legs 191 and 192 so that the spring force thereof is exerted in a direction away from the drive shaft 193 of torque motor 40.

The details of the braking element itself can best be seen in FIGURES 24 and 25. The brake unit assembly consists of a brake housing band 194 forming an endless strip enclosing the brake elements themselves. Attached to the motor support leg 192 is a brass clamping element 195 which retains by means of a pin 196, a curved strip of resilient material 197 such as beryllium bronze. On the inside of this strip of resilient material 197, there is a lining of heat resistant braking material 198 such as Teflon. This combination strip of resilient band 197 and braking material 198 forms an elongated strip which passes over the drive shaft 193 and comes in contact with a substantial portion of the circumference thereof. The extremity of this band is attached by means of the pin 189 to the brake bale 188 as aforementioned. To apply the brake, the brake cable 182 is pulled in the direction of the arrow 199 whereupon the brake band 198 will be wrapped more securely around the drive shaft 193, applying considerable friction thereto to stop the rotation thereof. When the tension on the brake cable 182 is released, the combined action of the resilient member 197 and the spring member 190 will cause the band to unwrap from around the shaft 193 permitting it to rotate freely once more.

As mentioned above, the configuration of the braking element for use in torque motor 41 is similar to that described in conjunction with torque motor 40. There are, however, a few minor differences. The brake element in this case is attached to the upper, right hand motor support leg 200. Further, the return spring element is slightly different. The return spring 201 has one extremity wrapped around and secured to the motor support leg 184. The spring 201 extends over the other motor support leg 202 and then extends laterally with a hooked portion 203 at its other extremity, adapted to receive the brake bale 204. As thus described, the brakes smoothly and efficiently bring each of the torque motors to a stop simultaneously, thus preventing any stretching or breaking of the recorded tape.

FIGURES 26 through 30 show the details of the brake actuating switch 27. This switch is connected in tandem to a conventional, multiwafer rotary switch of conventional design so that the brakes will be applied whenever the operator of the machine switches from one function to another or otherwise interrupts the operation of the machine. A rotary switch is not shown attached to the brake actuating portion of function switch 27 in order to contribute some clarity to the assembly but its means of attachment will be described in due course. FIGURE 28, taken along line 28—28 of FIGURE 2, shows the brake actuating mechanism mounted upon the control panel by means of the conventional threaded bushing 205 and nut 206. The control knob is shown partially at 207, connected to the control shaft 208 which extends through the bushing 205, the panel, and annular spacer 209, and then is integrally formed with an enlarged cylindrical receptor portion 210. Securely mounted on the shaft 208 and adjacent the receptor portion 210, there is a circular disc 211 having a pair of forwardly projecting knobs 212. The rear end of receptor portion 210 is drilled to form a bore 213 adapted to receive the control shaft of the aforementioned rotary switch. A diametrical passage 214 is formed in the receptor portion 210 cutting across the bore 213 so that the control shaft 208 can be securely locked to the control shaft of the aforementioned rotary switch by a small locking pin. It will be noted that the passage 214 forms a longitudinal slot so that receptor portion 210 can be slid relative to the rotary switch shaft without disengaging from it. The reason for this will soon become apparent.

Permanently secured to the annular spacer 209 is a circular cage member 215 forming the supporting structure for the remaining elements of the brake actuating mechanism. FIGURE 29 shows a front view of the circular cage member 215. There is an aperture 216 in the center of member 215 to allow the free passage therethrough of the control shaft 208. Positioned annularly around the aperture 216 is a planetary array of apertures 217 positioned to receive therein the knobs 212. The present drawing shows twelve such apertures but it will be understood that any number might be employed depending on the number of different positions required for the function switch. The case member 215 has upper and lower tabs formed thereon, numbered 218 and 219, respectively. These tabs provide mounting means for rearwardly extending brackets. To the lower tab 219, there is connected the rectangular supporting bracket 220 to which there is pivotally mounted upon pin 221, an upwardly extending toggle member 222. Toggle member 222 comprises a pair of substantially parallel members (see FIGURE 26) held together at their upper extremity by the pin 223 and spacer 224. The toggle member 222 is so positioned that it will come in contact with the rear end 225 of the receptor portion 210.

To the upper tab 218 there is also connected a substantially rectangular mounting bracket 226, a top view of which can be seen in FIGURE 27. Near the rearmost extremity of bracket 226, a toggle member 227 is pivotally mounted upon the pin 228 which extends laterally across the bracket 226. The forward extremity of toggle 227 has an apertured tab 229 to which there is attached the bale 230. It is to the bale 230 that the brake control cable 178 is secured. Opposite the pivot 228, the toggle 227 is provided with a depending tab portion 231 which contacts the lateral spacer 224.

Also attached to one side of the upper bracket 226 is a microswitch 232, positioned with its actuating button 233 in a downward position. A switchblade 234 is pivotally attached to the microswitch 232 and extends rearwardly and then obliquely upwardly and contacts a side pin 235 attached to the pin 223 of the vertical toggle 222. The electrical connections (not shown) to the microswitch 232 are such as will interrupt any voltage fed to the torque motors whenever the microscitch is open. In the position shown in FIGURE 28, the toggle 222 is in its forwardmost position and the knobs 212 are engaged in two of the planetary apertures 217. In this position, the brakes are disengaged and the microswitch is closed so that the machine can run in the record or playback position and the rotary switch cannot be turned. When the function switch is to be actuated, the knob 207 is depressed toward the panel in the direction of the arrow 236. This action simultaneously performs a number of operations. First of all, the knobs 212 are disengaged from the apertures 217 allowing the rotary switch to be turned to whatever new position is desired. As shown in FIGURE 30, the toggle member 222 is pushed backwardly by the receptor portion 210 and the switchblade 234 is allowed to pivot downwardly, counterclockwise so that it releases its upward pressure on the microswitch actuating button 233. This provides an electrical interlock cutting all power to the tape drive and capstan motors at the time the brakes are applied. The third function which occurs is the downward motion of the toggle 227 in the direction of the arrow 237 as it pivots about the point 228. This pivotal motion is induced by the rearward movement of toggle 222, which forces the spacer section 224 against the depending tab 231 of the toggle 227. The downward pivotal motion of toggle 227 thus applies tension through the bale 230 to the brake cable 178. After the switch has been rotated to its desired position, the knob 207 is released whereupon it will be allowed to move outward from the panel so that the knobs 212 will engage in a new set of apertures 217. This will release the pressure on the depending tab 231 and thereby release the tension on the brake cable. It will also provide an upward force on the switchblade 234 again depressing the switch button 233 which closes the microswitch completing the electrical connection from the A.C. voltage source to the torque motors once again.

*Projection system*

By making the size of the scribed trace on the tape relatively small as compared to the traces drawn by other direct writing recorders, the present invention lifts the direct writing oscillograph from the realm of glorified volt meters to an analytical device having useful frequency response capabilities. In addition, the present invention substantially lessens the requirement of exceedingly high recording media speeds and the large storage areas required for the recorded media. To permit the analysis of the scribed trace, it is necessary to enlarge the image to a size at least comparable to that produced by the common oscilloscope. One embodiment of a projection and enlargement system is shown in FIGURE 1 including the lamp unit 20, projector 21 and viewing screen 25.

FIGURES 3, 6, 7–10, 12 and 13 show more specific details of these basic elements. The lamp unit 20 is situated on the control panel immediately below the tape guide 17. Unit 20 (see FIGURE 8) includes a housing 238 secured to the control panel and a removable cover plate 239 which completes the enclosure of housing 238. The control panel is provided with an aperture 240 allowing access to the contact plug 241 mounted behind said aperture. The cover plate 239 has a recess 242 on the inner side thereof adapted to receive one end of the lamp 243, the other end of which is in contact with the plug 241. Since the cover plate 239 is readily removable, the lamp 243 can be easily exchanged in case of burnouts. The upper side of housing 238 has a longitudinal slit 244 immediately adjacent the slotted aperture 71 in the tape guide surface 65. Thus, the tape which passes by the slotted aperture 71 is completely illuminated by light from the lamp 243 passing through the aperture 244.

The projector unit 21 includes an enlarged housing 245 enclosing a series of lenses and mirrors which enlarge the image to practical viewing proportions. In the lower, front portion of housing 245, there is positioned an adjustable lens piece 69 which projects downwardly into the cavities 68 and 70 formed in the tape guide 17 so that it closely approaches the tape 14 which passes by the aperture 71. The lens piece 69 includes a lens 246 in the lower portion thereof. A bracket 247 connected to the top portion of this lens piece member 69 carries a planar mirror 248 thereon. Bracket 247 is inclined with respect to the vertical axis of lens piece 69 so that mirror 248 will laterally project the diverging image coming from the lens 246. The dotted lines 249 in FIGURE 8 indicate the approximate central and extreme portions of the projected light path. The still divergent image passes laterally to the right in FIGURE 8 to the extreme rear portion of housing 245. At this point, there is secured a second planar reflecting surface 250 inclined to project the image upwardly toward the center of viewing screen 25. Proper focus of the image is obtained by the focusing knob 251 which is attached to shaft 252 which in turn attaches to a pinion gear (not shown) which coacts with a rack (not shown) mounted upon the opposite side of the lens piece 69 which will cause the lens to move along its vertical axis. A compression spring 253 is retained between the lower wall 254 of housing 245 and a lateral tab 255 carrying a spring retaining pin 256 therein. Spring 253 biases the lens piece 69 downward with sufficient force to retain the position thereof after it has been adjusted to a desired position.

The lateral position of the lens piece 69 with respect to the tape 14 is critical, in that it is necessary that the lens be positioned directly over the inscribed trace so that the projected image will appear centered on the viewing screen 25. To accomplish accurate setting of the projector unit 21, the housing 245 is mounted to the control panel by splined mounting brackets 257 attached to the rear side of the control panel and positioned on each side of the large opening 258 provided in the center of said control panel. See FIGURES 12, 13. The brackets 257 have splines 259 on the inwardly facing rearwardly projecting portoins thereof. Attached to each side of the projector housing 245 are a pair of plates 260 having splines 261 thereon. Tapped holes 262 are provided in each of the spline plates 260 and retaining screws 263 are threaded therein. The retaining screws 263 extend through slots 264 in the rearwardly projecting legs of the mounting brackets 257. Thus, by loosening the retaining screws 263 on each side of the projection unit 221, the entire unit may be slid in a direction perpendicular to the control panel so that the lens element 69 can be accurately positioned over the slots 71. When the correct position is obtained, the screws 263 are tightened so that the adjustment is maintained.

The viewing screen 25 is shown in FIGURE 6 with a typical trace 265 sketched thereon. This screen 25 comprises a substantially rectangular piece of glass 266 which fills the rectangular upper portion of the housing 245. This glass may be ground on one side or clear as desired. The central portion of the glass 266 is set out by a mask 267 which extends around the edges and forms a rectangular viewing area. The central viewing area is graduated in units as desired and is provided with vertical and horizontal center lines. In a typical unit wherein the scribed trace width is approximately 35 mils, the projection unit is able to produce a viewable trace image having an area of 1.5 by 1.5 inches. Larger images are, of course, obtainable.

*Trace reproduction*

Until the advent of the present invention, it has been necessary to employ two types of units to perform the two functions of obtaining a written analog record of an electrical phenomenon and the recording of that phenomenon in a form by which it may be reproduced in its electrical form. Various types of direct writing oscillographs have been used to obtain a permanent record of the trace made by the waveform in question. To obtain a record which can reproduce the electrical signal, various forms of magnetic recording techniques are commonly used. The present invention performs both such functions in a single unit.

The result of the present recording system is the production of a transparent analog pattern upon a translucent tape. The projection of this pattern on the viewing screen 25 produces an enlarged single line light pattern which will move across the screen as the tape is advanced under the lens piece 69. In order to reproduce the original electrical signal, it is necessary to provide a means which senses the presence of this light pattern, and further, which can determine the relative positions of certain points along that line. As shown in FIGURE 6, a typical trace 265 may vary about the horizontal center 268. Thus, a means which senses the position of a given point along the trace 265 with relation to the center line 268, whether above or below the center line, would be effective in reproducing the electrical signal which produced that trace.

One embodiment of such a sensing unit is shown in FIGURES 6 through 10 on pages 2 and 3 of the drawings. FIGURE 9 is a cross sectional view taken through line 9—9 of FIGURE 6, and shows the essential elements of the sensing unit. Basically, the unit consists of a pair of photovoltaic cells 269 and 270 inclined at an acute angle to one another with their edges adjoined to form an apex 271. The photocells 269 and 270 are retained in position in a channeled holder 272 and a layer of insulating material 273 is situated between the rear side of each of the cells and the holder 272. An opaque coating 274 covers the front or apex side of the photocells entirely, except for a thin longitudinal slit 275 which extends substantially the length of the cells and around the apex portion thereof. The holder 272 is secured to the inner wall of the flat rectangular housing 276 which in turn completely surrounds the photocell unit. Housing 276 is set upon the viewing screen 25 in the viewable trace area and may be positioned anywhere along the horizontal center line 268. For permanent installation, it may be attached to the side of the projector housing 245 as shown by the mounting bracket 277. (See FIGURES 6 and 7.) The apex 271 of the photocells 269 and 270 is located immediately opposite the center line 268 as shown in FIGURE 8.

The width of slot 275 is such as will permit the passage of only a narrow section of the trace 265. As the trace moves past the slot 275, the light which passes therethrough will oscillate vertically up and down along the slot 275. Beginning at the apex point 271, as this oscillating light travels upwardly, it will fall on portions of photocell 269 which are progressively further away from the point of origin of the light. Since the output of these photovoltaic cells is a direct function of the intensity of illumination, and further, since the intensity of illumination is proportional to the square of the distance from the source, as the point of illumination progresses upwardly along photocell 269 from the apex 271, the intensity of illumination upon its surface will decrease and the output voltage will decrease.

Similarly, a point of illumination which travels down the photocell 270 away from the apex 271 results in a decreasing output voltage. As shown in FIGURE 9, the electrical connections made to cell 269 are opposite to those of cell 270, so that a decrease in voltage in cell 269 is read in terms of an increasing quantity whereas the converse is true for cell 270. In this manner, the apex point 271 acts as the reference point and is located at the center line. For other locations of reference points, different configurations and angles of photocells can be used to give outputs therefrom which approximate the value positions of the sampled point of illumination. An important feature of the "push-pull" type connection of the photocells is the cancellation of noise. Unavoidable inconsistencies in the emulsion on the tape leave some areas more light transmissive than others. These permit some light to reach the cells at random locations creating a considerable noise level. The opposed connection of the cells permits a noise signal voltage from one cell to partially cancel the noise signal from the other.

*Circuit diagrams*

Referring now to FIGURE 31, page 8 of the drawings, the two photocells 269 and 270 are shown. Their outputs are separately fed to individual preamplifiers 278 and 279, the outputs of which are in turn fed to a level mixer 280 which corrects for differences in voltage level, permits noise cancellation and adjusts the output. Level mixer 280 feeds to the main amplifier 281 when the selector switch 37 is turned to the position shown, wherein the contacts connect the output of level mixer 280 to the main amplifier 281. The output of amplifier 281 is then fed to the jack 282 which is on the front panel and to which a speaker or set of earphones 283 can be attached. A band-pass or low-pass filter 282a, including a suitable transformer, may be interposed at jack 282 to eliminate noise, etc. Selector switch 37 (see FIGURE 1) is the calibration or sound read-out selection switch which determines which inputs are to be fed to the main amplifier 281.

Referring in more detail to the block diagram shown in FIGURE 31, there are a number of elements which have not been heretofore mentioned. A precision voltage calibrator 284 provides a calibration voltage level to be fed to the input of the amplifier 281 the output of which in turn is connected to recording head 19, permitting the head to be preadjusted both electrically and mechanically to produce a desired trace on the tape before the tape is run at full speed. The circuitry involved in the calibrator 284 is shown in FIGURE 33. Terminals 285 and 286 are connected to a power supply, shown in FIGURE 31 at 287. A current limiting resistor 288 is connected between terminals 285 and 285a, thus permitting the zener diode capsule 289, 290 to conduct with a positive or negative voltage applied to its terminals. Resistor 288 limits the current through the diodes while the diodes provide a semisquare wave output voltage between terminals 285a and 286. Across these diodes is connected a precision voltage divider consisting of resistors 291 and 292 and a calibrated resistor 293, producing at the output terminal 294 a known constant peak-to-peak voltage. The output terminal 294 is connected to terminal 295 of the calibrate select switch 37. The wiper terminal 296 of switch 37 connects to terminal 297 which feeds to the input of the main amplifier 281. The second terminal 298 of select switch 37 is coupled to the output of the level mixer 280 so that when switch 37 is in the proper position, the output of the level mixed will be fed to terminal 297 which feeds the amplifier 281 through the input attenuator 32. The third terminal 299 of switch 37 is coupled to the input termimnal 30 on the front panel which includes a positive voltage feed terminal 30a, a negative voltage feed terminal 30b and a common potential terminal 30c which are connected to supply 287. The dotted line indicated generally 37 indicates that the wiper contact 296 is also mechanically connected by the shaft of switch 37 to the second wiper terminal 296a. Terminal 296a is connected to the power supply at terminal 300 and is operable to couple this power supply to the photocell preamps 278 and 279 when the select switch is in the position shown and at the same time connecting terminal 296 to terminal 298, coupled to the level mixer 280.

Returning to FIGURE 31, input terminal 30b is an optional terminal which connects to the negative side and terminal 30a connects to the positive side of power supply 287 to provide externally available voltage sources. Although some input signals will be sufficiently strong as not to require any further amplification prior to introduction to the main amplifier 281, preamplifier units may be necessary. In such instances, the external voltage points 30a and 30b are provided to power such preamplifiers. For example, the microphone input 31 employs a preamplifier and limiter 301 and the terminals 302, 302a and 302b will connect to the input terminals 30, 30a and 30b. Likewise, a universal probe 303 may require a preamplification stage 304 and its terminals 305, 305a and 305b will be adapted for connection to input terminals 30, 30a and 30c, for example. As mentioned, the preamplifier 301 includes a limiter or compressor of usual design for use in audio-recording to prevent overshooting of the trace amplitude which would introduce considerable distortion when the trace is reproduced.

Preliminary to the recording of an input signal onto the tape, it is necessary to know both the peak-to-peak amplitude and the DC voltage level of the main amplifier 281 so that the attenuator 32 may be adjusted to keep the recording head from being driven beyond its limits. This could be done by merely running the tape in the record position and adjusting the attenuator until the desired limits were reached. The difficulty with this, however, is that the operator would have to stop and go back to examine the recorded trace to see if it were within the limits of the recording head. In addition to consuming a lot of time, this procedure results in the wastage of a lot of tape. To eliminate this, switch 309 is provided to connect the output of amplifier 281 to a peak voltage indicator unit 310. Unit 310 feeds directly to the front panel meter 35. Switch 311 selects between both positive and negative peak voltages and indicates on the meter 35 the full scale value thereof. In its center position, switch 311 permits DC zero centering of the amplifier adjusted by the control 36 (FIGURE 1), and indicates on meter 35 when the zero center is attained.

I claim:
1. A direct writing oscillograph, comprising:
 (a) an elongate strip of recording tape, said tape comprising a transparent base having a translucent emulsion coating on one side thereof;
 (b) first and second storage means for said recording tape;
 (c) means for transporting said tape between said first and second storage means, said means including means for continuously varying the speed of said tape transporting means;
 (d) stationary guidance means for said tape, said guidance means situated intermediate said first and second storage means, said guidance means having a slot extending along the lower edge thereof, the base of said slot having a surface which is curved along the longitudinal dimension thereof, the radius of curvature of said slot being greater than the longitudinal dimension thereof, said slot receiving said recording tape as said tape is transported between said first and second storage means whereby the transparent base surface of said tape is in contact with said curved surface, the width of said slot being only slightly greater than the width of said tape, a resilient insert positioned upon the curved surface in said slot intermediate the ends thereof, the base of said slot having an optical slit extending laterally thereacross, said slit located intermediate the ends of said guidance means and spaced from said resilient insert;

(e) means adjacent said guidance means for inscribing a trace on said tape representing an analog voltage-time waveform, said inscribing means comprising a stylus, a stylus arm carrying said stylus, driving means coupled to said stylus arm operative to produce oscillations thereof in response to incoming electrical signals, means coupling said incoming electrical signals to said driving means, means for moving said stylus into contact with said tape whereby said stylus will strike the aforesaid emulsion coating thereof at a point immediately opposite the resilient insert in said slot; and (f) means for optically projecting said trace to form an enlarged image thereof, said projecting means comprising a light source located adjacent the optical slit in said guidance means, a lens element, said lens element adjustably mounted adjacent the opposite side of said slit from said light source, image magnifying means adapted to receive the image from said lens element, and a graduated viewing screen positioned to receive the image from said magnifying means.

2. A direct writing oscillograph, comprising:
(a) an elongate strip of recording tape;
(b) first and second storage means for said recording tape;
(c) means for transporting said tape between said first and second storage means, said means including means for varying the speed of said tape transport means, said transport means including first and second driving motors coupled to said first and second storage means respectively, braking means coupled to said driving motors, said braking means includes means for simultaneously interrupting the coupling of said incoming electrical signals to said stylus driving means when said braking means are applied, and means for simultaneously applying said braking means to both said motors;
(d) tape guidance means situated between said first and second storage means;
(e) means adjacent said guidance means for inscribing a trace on said tape representing an analog voltage-time waveform, said inscribing means comprising a stylus and stylus arm, means for driving said stylus arm in response to incoming electrical signals, means coupling said electrical signals to said driving means, means for moving said stylus into contact with said tape; and
(f) means for optically projecting said trace to form an enlarged image thereof.

3. A direct writing oscillograph, comprising:
(a) an elongate strip of recording tape, said tape comprising a transparent base having a translucent emulsion coating on one side thereof;
(b) first and second storage means for said recording tape;
(c) means for transporting said tape between said first and second storage means, said means including means for varying the speed of said tape transport means, said transport means including first and second driving motors coupled to said first and second storage means respectively, braking means coupled to said driving motors, and means for simultaneously applying said braking means to both said motors and means coupled to said transport means for continuously indicating the relative locations of points on said tape;
(d) guidance means for said tape, said guidance means situated intermediate said first and second storage means, said guidance means having a slot extending along the lower edge thereof, the base of said slot having a surface which is curved along the longitudinal dimension thereof, said slot receiving said recording tape as said tape is transported between said first and second storage means whereby the transparent base surface of said tape is in contact with said curved surface, the width of said slot being only slightly greater than the width of said tape, a resilient insert positioned upon the curved surface in said slot intermediate the ends thereof, the base of said slot having an optical slit extending laterally thereacross, said slit located intermediate the ends of said guidance means and spaced from said resilient insert;

(e) means adjacent said guidance means for inscribing a trace on said tape representing an analog voltage-time waveform, said inscribing means comprising a stylus, a stylus arm carrying said stylus, driving means coupled to said stylus arm operative to produce oscillations thereof in response to incoming electrical signals, means coupling said incoming electrical signals to said driving means, means for moving said stylus into contact with said tape whereby said stylus will strike the aforesaid emulsion coating thereof at a point immediately opposite the resilient insert in said slot, means coupled to said braking means for simultaneously interrupting the coupling of said incoming electrical signals to said stylus driving means when said braking means are applied, said interrupting means including means removing said stylus from contact with said tape; and (f) means for optically projecting said trace to form an enlarged image thereof, said projecting means comprising a light source located adjacent the optical slit in said guidance means, a lens element, said lens element adjustably mounted adjacent the opposite side of said slit from said light source, image magnifying means adapted to receive the image from said lens element, and a graduated viewing screen positioned to receive the image from said magnifying means.

4. A direct writing oscillograph, comprising:
(a) an elongated strip of recording tape, said tape comprising a transparent base having a translucent emulsion coating on one side thereof;
(b) first and second storage means for said recording tape;
(c) means for transporting said tape between said first and second storage means, said means including means for varying the speed of said tape transport means, means for braking said transport means, and means coupled to said transport means for continuously indicating the relative locations of points on said tape;
(d) tape guidance means situated between said first and second storage means;
(e) one or more means adjacent said guidance means for inscribing one or more traces on said tape, each of said inscribing means comprising a stylus arm, means driving each said stylus arm, means coupling electrical signals to said driving means, means for moving each stylus into contact with said tape, means fixing the lateral positions of each stylus with respect to said tape, means coupled to said braking means simultaneously interrupting said means coupling said electrical signals to said stylus driving means when said braking means are applied, said interrupting means including means removing said styli from contact with said tape; and
(f) means for optically projecting one or more of said traces to form an enlarged image thereof.

5. Apparatus of the type described in claim 4 wherein at least one of said inscribing means is coupled to an external electrical signal whereby said means inscribes a trace on said tape representing an analog voltage-time waveform.

6. Apparatus of the type described in claim 4 wherein at least one of said inscribing means is coupled to an external electrical signal whereby said means inscribes a trace on said tape representing an analog of said electrical signal, a second of said inscribing means coupled to an internal pulse generating means, means triggering said pulse generating means operative to cause said second inscribing means to produce an interrupted trace on said tape.

7. An apparatus of the type described in claim 6 wherein said triggering means comprises a signal generator of variable output frequency whereby said interrupted trace inscribed on said tape is in the form of dashes representing time intervals.

8. Means for inscribing a trace upon a strip of recording tape wherein said tape is transported past said inscribing means, the subcombination comprising, a housing including means for mounting said housing in movable relationship to said tape; a C-magnet mounted in said housing, said magnet having inwardly facing poles; a pair of laminated pole pieces each having a generally U-shaped configuration, a base block mounted in said housing and positioned within said C-magnet, said block being generally rectangular and having upwardly extending sides, one of said pole pieces mounted upon each one of said sides, the base of each pole piece positioned in abutment with one of the pole faces of said magnet, the extremities of each of said U-shaped pole pieces having nonparallel faces; an armature, a torsion member mounted coaxial to said armature, said torsion member rigidly mounted to said base block and supporting said armature thereabove, said armature extending vertically between the extremities of said pole pieces, the cross section of said armature being generally rhombic wherein the acute angle is greater than the acute angle formed between the faces of said pole pieces; a field coil mounted upon each one of said pole extremities, means coupling each said coil to a source of electrical signals; a stylus arm horizontally mounted upon the upper end of said armature, said arm carrying a stylus at the extremity thereof adapted to inscribe a line upon said recording tape; said coupling means operative to induce varying currents in said field coils for causing axial rotation of said armature.

9. An article of the type described in claim 8 wherein the upper end of said armature is coupled to means for preventing movement of said end about any horizontal axes, said means comprising a bridge mounted in said housing and extending laterally across the upper end of said armature; a first bearing mounted in an axial bore in said armature, said bearing comprising a bottom piece, the surface of which is convex upward and an annular bearing piece spaced above said bottom piece, a second bearing member comprising a pin mounted upon said bridge, said pin having a substantially cylindrical bearing tip, said tip adapted to fit within said first bearing whereby the end thereof contacts said convex piece and the periphery thereof contacts the inner periphery of said annular piece.

10. A direct writing oscillograph, comprising:
(a) an elongate strip of recording tape, said tape comprising a transparent base having a translucent emulsion coating on one side thereof;
(b) first and second storage means for said recording tape;
(c) means for transporting said tape between said first and second storage means, said means including means for continuously varying the speed of said tape transporting means;
(d) stationary guidance means for said tape, said guidance means situated intermediate said first and second storage means, said guidance means having a slot extending along the lower edge thereof, the base of said slot having a surface which is curved along the longitudinal dimension thereof, the radius of curvature of said slot being greater than the longitudinal dimension thereof, said slot receiving said recording tape as said tape is transported between said first and second storage means whereby the transparent base surface of said tape is in contact with said curved surface, the width of said slot being only slightly greater than the width of said tape, a resilient insert positioned upon the curved surface in said slot intermediate the ends thereof, the base of said slot having an optical slit extending laterally thereacross, said slit located intermediate the ends of said guidance means and spaced from said resilient insert;
(e) means adjacent said guidance means for inscribing a trace on said tape representing an analog voltage-time waveform, said inscribing means comprising a stylus, a stylus arm carrying said stylus, driving means coupled to said stylus arm operative to produce oscillations thereof in response to incoming electrical signals, means coupling said incoming electrical signals to said driving means, means for moving said stylus into contact with said tape whereby said stylus will strike the aforesaid emulsion coating thereof at a point immediately opposite the resilient insert in said slot;
(f) means for optically projecting said trace to form an enlarged image thereof, said projecting means comprising a light source located adjacent the optical slit in said guidance means, a lens element, said lens element adjustably mounted adjacent the opposite side of said slit from said light source, image magnifying means adapted to receive the image from said lens element, and a graduated viewing screen positioned to receive the image from said magnifying means; and
(g) light responsive means mounted in the path of said projected image, said means operative to produce electrical currents determined by the relative position where said image strikes said responsive means, and amplifying means coupled to said responsive means for amplifying the aforesaid electrical currents to reproduce the input voltage-time signal.

11. A direct writing oscillograph, comprising:
(a) an elongate strip of recording tape, said tape comprising a transparent base having a translucent emulsion coating on one side thereof;
(b) first and second storage means for said recording tape;
(c) means for transporting said tape between said first and second storage means, said means including means for varying the speed of said tape transport means, said transport means including first and second driving motors coupled to said first and second storage means respectively, braking means coupled to said driving motors, and means for simultaneously applying said braking means to both said motors, and means coupled to said transport means for continuously indicating the relative locations of points on said tape;
(d) guidance means for said tape, said guidance means situated intermediate said first and second storage means, said guidance means having a slot extending along the lower edge thereof, the base of said slot having a surface which is curved along the longitudinal dimension thereof, said slot receiving said recording tape as said tape is transported between said first and second storage means whereby the transparent base surface of said tape is in contact with said curved surface, the width of said slot being only slightly greater than the width of said tape, a resilient insert positioned upon the curved surface in said slot intermediate the ends thereof, the base of said slot having an optical slit extending laterally thereacross, said slit located intermediate the ends of said guidance means and spaced from said resilient insert;
(e) means adjacent said guidance means for inscribing a trace on said tape representing an analog voltage-time waveform, said inscribing means comprising a stylus, a stylus arm carrying said stylus, driving means coupled to said stylus arm operative to produce oscillations thereof in response to incoming electrical signals, means coupling said incoming electrical signals to said driving means, means for moving said stylus into contact with said tape whereby said stylus will strike the aforesaid emulsion coating thereof at a point immediately opposite the resilient insert in said slot, means coupled to said braking means for simultaneously interrupting the coupling of said incoming electrical signals to said stylus driving means when said braking means are applied, said interrupting means including means removing said stylus from contact with said tape;

(f) means for optically projecting said trace to form an enlarged image thereof, said projecting means comprising a light source located adjacent the optical slit in said guidance means, a lens element, said lens element adjustably mounted adjacent the opposite side of said slit from said light source, image magnifying means adapted to receive the image from said lens element, and a graduated viewing screen positioned to receive the image from said magnifying means; and (g) light responsive means mounted in the path of said projected image, said means operative to produce electrical currents determined by the relative position where said image strikes said responsive means, and amplifying means coupled to said responsive means for reproducing the aforesaid electrical currents.

12. A direct writing oscillograph, comprising:

(a) an elongate strip of recording tape, said tape comprising a transparent base having a translucent emulsion coating on one side thereof;

(b) first and second storage means for said recording tape;

(c) means for transporting said tape between said first and second storage means, said means including means for varying the speed of said tape transport means, means for braking said transport means, and means coupled to said transport means for continuously indicating the relative locations of points on said tape;

(d) tape guidance means situated between said first and second storage means;

(e) one or more means adjacent said guidance means for inscribing one or more traces on said tape, each of said inscribing means comprising a stylus and stylus arm, means driving each said stylus arm, means coupling electrical signals to said driving means, means for moving each stylus into contact with said tape, means fixing the lateral positions of each stylus with respect to said tape, means coupled to said braking means simultaneously interrupting said means coupling said electrical signals to said stylus driving means when said braking means are applied, said interrupting means including means removing said styli from contact with said tape;

(f) means for optically projecting one or more of said traces to form an enlarged image thereof; and (g) sensing means responsive to the projected image of one or more of said traces, said means operative to electrically reproduce the electrical signals recorded on said tape.

13. A direct writing oscillograph, comprising:

(a) an elongate strip of recording tape, said tape comprising a transparent base having a translucent emulsion coating on one side thereof;

(b) first and second storage means for said recording tape;

(c) means for transporting said tape between said first and second storage means, said means including means for continuously varying the speed of said tape transporting means;

(d) tape guidance means situated between said first and second storage means, said guidance means having a slot extending along the lower edge thereof adapted to receive said tape therein, said slot having an optical slit therein;

(e) means adjacent said guidance means for inscribing a trace on said tape representing an analog voltage-time waveform, said inscribing means comprising a stylus, a stylus arm carrying said stylus at one end thereof, driving means coupled to the other end of said arm, means coupling said driving means to the source of incoming electrical signals to be recorded, said coupling means and said driving means operative to induce oscillations in said arm analogous to said electrical signals, means for moving said stylus into contact with said tape in said slot;

(f) means for optically projecting said trace to produce an enlarged image thereof, said projecting means comprising a light source positioned below the optical slit in said tape guidance slot, a lens element positioned above said slit, image magnifying and projecting means positioned to receive the image from said lens element, a graduated viewing screen positioned to receive the projected image from said magnifying means;

(g) light responsive means positioned to receive a portion of said projected image, said means comprising at least one photocell, a light-tight housing containing said photocell, one wall of said housing having a narrow slit therein adjacent the sensitive side of said photocell, the edges of said slit being non-parallel whereby varying quantities of light will reach said photocell depending upon the relative location of the projected image, and amplifying means coupled to said photocell for reproducing the output thereof.

14. A direct writing oscillograph, comprising:

(a) an elongated strip of recording tape, said tape comprising a transparent base having a translucent emulsion coating on one side thereof;

(b) first and second storage means for said recording tape;

(c) means for transporting said tape between said first and second storage means, said means including means for continuously varying the speed of said tape transporting means;

(d) tape guidance means situated between said first and second means, said guidance means having a slot extending along the lower edge thereof adapted to receive said tape therein, said slot having an optical slit therein;

(e) means adjacent said guidance means for inscribing a trace on said tape representing an analog voltage-time waveform, said inscribing means comprising a stylus, a stylus arm carrying said stylus at one end thereof, driving means coupled to the other end of said arm, means coupling said driving means to the source of incoming electrical signals to be recorded, said coupling means and said driving means operative to induce oscillations in said arm analogous to said electrical signals, means for moving said stylus into contact with said tape in said slot;

(f) means for optically projecting said trace to produce an enlarged image thereof, said projecting means comprising a light source positioned below the optical slit in said tape guidance slot, a lens element positioned above said slit, image magnifying and projecting means positioned to receive the image from said lens element, a graduated viewing screen positioned to receive the projected image from said magnifying means; and (g) light responsive means positioned to receive a portion of said projected image, said means comprising a light-tight housing, a plurality of photocells in said housing, one wall of said housing adjacent the sensitive side of said cells having a narrow slit adapted to permit a small portion of said projected image to reach said photocells, said photocells electrically coupled in opposite polarity operative to detect polarity changes in the projected image of said waveform, and amplifying means coupled to said photocells for reproducing the outputs thereof.

15. Apparatus of the type described in claim 14 wherein said photocells comprise a pair of photovoltaic cells, said cells being mounted in a coplanar fashion end-to-end, the line describing the end-to-end junction of said cells being positioned adjacent the horizontal centerline of said viewing screen, the edges of said slit in said housing being nonparallel and discontinuous at a point adjacent said centerline, said slit being narrowest at said centerline and becoming wider upwardly and downwardly therefrom, said photovoltaic cells electrically coupled in opposite polarity operative to produce increasingly greater output values as said portion of said projected image moves away from said centerline.

16. Apparatus of the type described in claim 14 wherein said photocells comprise a pair of photovoltaic cells, said cells being mounted in said housing in end-to-end relationship forming an angle therebetween, the apex of said angle being positioned adjacent the centerline of said viewing screen, the walls of said housing adjacent the sensitive sides of each of said cells spaced therefrom and forming an angle the apex of which is adjacent the apex of said cells, said slit extending along both of said walls.

References Cited

UNITED STATES PATENTS

| | | | |
|---|---|---|---|
| 2,141,964 | 12/1938 | Yonkers | 346—77 X |
| 2,166,079 | 7/1939 | Ricchiardi | 274—11 |
| 2,403,986 | 7/1946 | Lacy | 179—1 |
| 2,497,142 | 2/1950 | Shephard | 179—100.4 |
| 2,506,500 | 5/1950 | Hardy | 346—77 |
| 2,673,137 | 3/1954 | Dubusc | 346—111 |
| 3,069,510 | 12/1962 | Noble | 179—100.4 |
| 3,092,344 | 6/1963 | Dinsmore et al. | 242—55.12 |
| 3,210,466 | 10/1965 | Day | 346—77 X |

RICHARD B. WILKINSON, *Primary Examiner.*

J. W. HARTARY, *Assistant Examiner.*